US012485454B2

(12) United States Patent
Reed et al.

(10) Patent No.: US 12,485,454 B2
(45) Date of Patent: Dec. 2, 2025

(54) BIN CLEANING SYSTEMS AND METHODS OF USE

(71) Applicant: PACKLINE TECHNOLOGIES, INC., Dinuba, CA (US)

(72) Inventors: Lorin Reed, Kingsburg, CA (US); Jim Moshier, Visalia, CA (US)

( * ) Notice: Subject to any disclaimer, the term of this patent is extended or adjusted under 35 U.S.C. 154(b) by 0 days.

(21) Appl. No.: 17/174,349

(22) Filed: Feb. 11, 2021

(65) Prior Publication Data

US 2021/0245206 A1 Aug. 12, 2021

Related U.S. Application Data

(63) Continuation-in-part of application No. 15/897,104, filed on Feb. 14, 2018, now Pat. No. 11,090,701.

(60) Provisional application No. 62/975,190, filed on Feb. 11, 2020, provisional application No. 62/458,579, filed on Feb. 14, 2017.

(51) Int. Cl.

| | |
|---|---|
| ***B08B 3/02*** | (2006.01) |
| ***B05B 3/12*** | (2006.01) |
| ***B05B 15/656*** | (2018.01) |
| ***B08B 13/00*** | (2006.01) |
| *A01F 25/14* | (2006.01) |

(52) U.S. Cl.

CPC ................ *B08B 3/024* (2013.01); *B05B 3/12* (2013.01); *B05B 15/656* (2018.02); *B08B 13/00* (2013.01); *A01F 25/14* (2013.01)

(58) Field of Classification Search

CPC ............ B05B 13/0636; B05B 13/0627; B05B 15/656; B05B 3/12; B08B 3/024; B08B 13/00

See application file for complete search history.

(56) References Cited

U.S. PATENT DOCUMENTS 3,615,822 A 10/1971 Molinari
4,422,409 A 12/1983 Walker et al.
5,464,482 A * 11/1995 Michael .................. A47L 15/22 134/172

(Continued)

FOREIGN PATENT DOCUMENTS

CN 102553872 7/2012
CN 202368826 8/2012

(Continued)

OTHER PUBLICATIONS

Kanebo Ltd, Container washing device having many through holes, English Abstract of Japanese Patent Publication JPH0679249A, Sept. 3, 1992, European Patent Organization, http://www.epo.org/searching/free/espacenet.html.

(Continued)

*Primary Examiner* — Cody J Lieuwen

(74) *Attorney, Agent, or Firm* — Sierra IP Law, PC; William K. Nelson

(57) ABSTRACT

The invention relates to apparatuses, machines, systems and methods for periodically washing and/or disinfecting the interior of individual containers having a polygonal base (e.g., rectangular), such as bins of the type used for the used for agricultural commodity collection, storage, and transport (agricultural bins), as well as other types of bins and containers. The systems of the present invention may be operable to automatically and thoroughly clean the interior of such bins.

20 Claims, 19 Drawing Sheets

(56) References Cited

U.S. PATENT DOCUMENTS

| | | | | |
|---|---|---|---|---|
| 5,842,492 | A | 12/1998 | Lee | |
| 6,336,239 | B1 * | 1/2002 | Cooper | B08B 9/0808 15/71 |
| 6,758,225 | B2 | 7/2004 | Thompson et al. | |
| 7,152,550 | B2 | 12/2006 | Walker | |
| 7,225,816 | B2 | 6/2007 | Byers | |
| 8,118,948 | B1 * | 2/2012 | Szabo | B08B 3/026 134/169 R |
| 8,122,898 | B2 | 2/2012 | Geppert et al. | |
| 8,267,101 | B2 | 9/2012 | Bear et al. | |
| 8,834,648 | B2 | 9/2014 | Fountain | |
| 9,616,468 | B2 | 4/2017 | Parslow, II | |
| 10,779,702 | B2 | 9/2020 | Mingfeng | |
| 2008/0105761 | A1 | 5/2008 | Amestoy et al. | |
| 2010/0043834 | A1 * | 2/2010 | Scheringer | A47L 15/241 134/25.2 |
| 2011/0036381 | A1 | 2/2011 | Zilai et al. | |
| 2011/0246162 | A1 | 10/2011 | Brown et al. | |
| 2012/0048301 | A1 | 3/2012 | Beard et al. | |
| 2013/0019906 | A1 | 1/2013 | Parslow, II | |
| 2013/0291907 | A1 | 11/2013 | Brozik et al. | |
| 2014/0251206 | A1 * | 9/2014 | Kim | B05B 13/005 118/306 |
| 2015/0000708 | A1 * | 1/2015 | Welch | A47L 15/23 134/179 |

FOREIGN PATENT DOCUMENTS

| | | |
|---|---|---|
| CN | 204018335 | 12/2014 |
| CN | 204208869 | 3/2015 |
| CN | 104707829 | 6/2015 |
| CN | 204417091 | 6/2015 |
| CN | 105537223 | 5/2016 |
| CN | 205393129 | 7/2016 |
| EP | 0137416 | 4/1985 |
| EP | 0634230 | 12/1998 |
| EP | 1803507 | 7/2007 |
| GB | 2003840 | 3/1979 |
| JP | H0679249 A | 3/1994 |
| KR | 100832395 | 5/2008 |
| KR | 20120042042 | 5/2012 |
| WO | 2003002276 A1 | 6/2001 |

OTHER PUBLICATIONS

Zhenqing et al., Automatic wash ton bucket system, English Abstract of Chinese Patent Publication CN205393129, Jul. 7, 2016, European Patent Organization, http://www.epo.org/searching/free/espacenet.html.

Song et al., Automatic cleaning machine of water bucket, English Abstract of Chinese Patent Publication CN102553872, Jul. 11, 2012, European Patent Organization, http://www.epo.org/searching/free/espacenet.html.

Jianhua et al., Full-automatic beer bucket washing and filling machine, English Abstract of Chinese Patent Publication CN204417091, Jun. 24, 2015, European Patent Organization, http://www.epo.org/searching/free/espacenet.html.

Qiyuan et al., Full-automatic bucket washing device for drinking water production line, English Abstract of Chinese Patent Publication CN204208869, Mar. 18, 2015, European Patent Organization, http://www.epo.org/searching/free/espacenet.html.

Pan et al., Automatic barrel washing machine, English Abstract of Chinese Patent Publication CN204018335, Dec. 17, 2014, European Patent Organization, http://www.epo.org/searching/free/espacenet.html.

Ye et al., Barreled water bucket washout machine, English Abstract of Chinese Patent Publication CN202368826, Aug. 8, 2012, European Patent Organization, http://www.epo.org/searching/free/espacenet.html.

Yuguo et al., Automatic barrel washer, English Abstract of Chinese Patent Publication CN105537223, May 4, 2016, European Patent Organization, http://www.epo.org/searching/free/espacenet.html.

Jianhang et al., Barreled water barrel alkali washing technology, English Abstract of Chinese Patent Publication CN104707829, Jun. 17, 2015, European Patent Organization, http://www.epo.org/searching/free/espacenet.html.

Koo et al., Natural Water Bulk Washing Way and Apparatus, English Abstract of Korean Patent Publication KR20120042042, May 3, 2012, European Patent Organization, http://www.epo.org/searching/free/espacenet.html.

Ryul et al., Natural Water Bottle Washing Method and Device of Non Turning Way That Use Many Ascent and Descent Nozzle That is Arranged by Specification, English Abstract of Korean Patent Publication KR100832395, May 26, 2008, European Patent Organization, http://www.epo.org/searching/free/espacenet.html.

Fernandez et al., High speed bottle washing machine and nozzle spray assembly, English Abstract of European Patent Publication EP0634230, Dec. 23, 1998, European Patent Organization, http://www.epo.org/searching/free/espacenet.html.

Cristanini, Washing and disinfecting apparatus, particularly for roadside trash bins, English Abstract of European Patent Publication EP0137416, Apr. 17, 1985, European Patent Organization, http://www.epo.org/searching/free/espacenet.html.

Newsmith—Bin Washers—Apr. 19, 2016—available at https://web.archive.org/web/20160419164244/https://www.newsmiths.co.uk/product/bin-washers/.

* cited by examiner

BIN CLEANING SYSTEMS AND METHODS OF USE

FIELD OF THE INVENTION

The present invention relates to systems for cleaning bins, and more particularly to systems, methods and apparatus for cleaning all areas of a bin thoroughly using an extendable spray arm mechanism.

DISCUSSION OF THE BACKGROUND

Bins used in the agricultural industry tend to collect pits, meat, skin, leaves, and other organic material from the fruits, vegetables, and nuts that they are used to collect, store and transport. If such material is not removed periodically from the bins, the material may provide a breeding ground for bacteria and fungus, and may foul the healthy fruits, nuts, and vegetables that are placed in the bin. Thus, bin washing is important in the agricultural industry for delivering fresh, quality produce.

Conventional techniques for washing such bins are flawed. Automated processes have failed to thoroughly clean the bins due to the size and elongate or polygonal shapes, which hamper free and full access to the interior of the bin, particularly the corners, during cleaning. Manual washing is very time and labor intensive. A worker must use a hand-held spray gun to spray cleaning fluid under pressure into the bin. This is generally economically infeasible due to the large number of bins in a typical harvesting operation.

The existing methods for cleaning agricultural bins are insufficient, and are in need of improvement. It is therefore desirable to provide novel systems and methods for automatically and thoroughly washing agricultural containers.

SUMMARY OF THE INVENTION

Embodiments of the present invention provide apparatuses, machines, systems and methods for periodically washing and/or disinfecting the interior of individual containers having a polygonal base (e.g., rectangular), such as bins of the type used for the used for agricultural commodity collection, storage, and transport (agricultural bins). The systems of the present invention may be operable to automatically and thoroughly clean the interior of such bins. The systems of the present invention may include rotating sprayer arms that rotate within the bin and are operable to oscillate (e.g., radially extend and contract) along a plane of rotation to thereby extend to varying radii from an axis of rotation. The operability to vary the radius of the sprayer arms allows the sprayer arms to effectively reach the corners between the sidewalls of the polygonal bin. The systems of the present invention are operable to clean the interior of agricultural bins thoroughly to prevent accumulation of organic material and other contaminants in the bins and prevent or reduce contamination of the bins. However, it should be understood that the systems of the present invention may also be used to clean containers used in other industries, such as bins for collecting rubbish, industrial or agricultural waste, etc.

The systems of the present invention may include a rotating bin spraying apparatus over which an agricultural bin may be positioned such that the rotating spraying apparatus is located in proximity to the walls and floor of the bin. In some embodiments, the bins may be inverted and placed over the rotating spraying apparatus, such that debris falls out of the agricultural bin as the rotating spraying apparatus dislodges the debris from the interior walls of the agricultural bin. Other relative orientations of the bin and the spraying apparatus are within the scope of the present invention. For instance, the bins may be positioned at an oblique downward angled position to allow for drainage and the spraying apparatus may be positioned at the same oblique angle within the bin.

In some embodiments, the rotating spraying apparatus may be on an extendable arm operable to extend the rotating spraying apparatus into the bin to reach the interior floor and corners of the bin. The rotating spraying apparatus may include at least one sprayer manifold on which a plurality of spraying heads may be mounted and in fluid communication with a pressurized fluid source. The sprayer manifold may be about L-shaped such that it is about complementary to the sidewalls and floor of the interior of the agricultural bin, which may be orthogonally or substantially orthogonally positioned relative to one another.

Once positioned in the bin, the rotating spraying apparatus may be rotated on a rotational plane that is parallel or substantially parallel to the floor of the bin. This rotation allows the spraying manifold to be directed at each radial angle of the interior of the bin and to spray the entire interior of the bin. However, as previously noted, radial distances between the center of the bin and the walls and corners of the bin vary because the bins are polygonal prism structures (e.g., having a rectangular floor and orthogonal sides). In order for the spraying manifold to be positioned at a consistent proximity to the interior walls of the bin, rotating spraying apparatus of the present invention includes a dynamic extendable articulating arm mechanism to which the at least one spraying manifold is attached and that is operable to extend and retract the one or more spraying manifolds such that the plurality of spraying heads are maintained at a consistent distance from the interior of the agricultural bin as the rotating spraying apparatus rotates on the rotational plane. The dynamic extendable arm mechanism allows all the interior surfaces of the agricultural bin to be sprayed with substantially equal pressure, including the surfaces in the corners of the bins.

The rotating spraying apparatus may include a rotating shaft operable to rotate the rotating spraying apparatus once it is inserted into an agricultural bin. The extendable articulating arm mechanism may be mechanically connected to the rotating axial shaft. In some embodiments, the extendable articulating arm mechanism may be include an extendable and retractable articulating arm with parallel motion linkage connection to a static arm that is fixedly connected to the rotating shaft. For example, the static arm portion and an extendable articulating arm portion may be connected by parallel linkage bars that are each connected at one end by a pivoting joint to the static arm and a second pivot joint to the extendable arm that allows the extendable arm to move outward from the rotating shaft such that the radial distance of the spraying manifold from the rotating shaft is increased. The rotating spraying apparatus may have one or more of the extendable articulating arm mechanisms (e.g., two positioned on the rotating axial shaft at 180° relative to each other, three positioned on the rotating axial shaft at 120° relative to each other, etc.).

The extension and retraction of the one or more extendable articulating arms may be controlled by a control mechanism operable to extend and retract the one or more extendable articulating arms as the rotating spraying apparatus rotates on the rotating axial shaft. In some embodiments, the control mechanism may be a track with which an engagement and following structure (e.g., a pin roller, or other structure) of the extendable articulating arm is mechanically engaged. The track may guide the following pin as the rotating axial shaft drives the rotation of the extendable articulating arm and direct the extension and retraction of the extendable articulating arm. For example, the control mechanism may be a plate or frame structure having a track therein with which the one or more extendable articulating arms are engaged. The engagement and following structure may be in a fixed position on the one or more extendable articulating arms that is engaged with the track and operable to slide, roll, or otherwise freely move along and follow the track.

The one or more extendable articulating arms may be extended or retracted as the engagement structure moves along the track, the track having a pre-determined and precisely engineered path that maintains the distal end of the scissor arm a constant distance (e.g., 1 to 6 inches) from the interior sidewalls of the agricultural bin as the one or more extendable articulating arms are rotated through the interior of the agricultural bin. To illustrate, the one or more extendable articulating arms may be pulled outward by the engagement structure as it moves along the track, causing the parallel-motion linkage bars to pivot and extend with the extendable portion of the extendable articulating arm. The change in the radial distance from the rotating shaft along the track may be equal to the change in the radial distance from the rotating shaft of the corresponding portion of the interior wall of the bin. The track may have a predetermined design that is complementary to the polygonal shape of the base of the bin, such that the spraying heads on the spraying manifold are always a fixed distance from the interior bin wall as the one or more extendable articulating arms rotate through the interior of the bin. The plate or frame structure and the track of the control mechanism may be configured to be complementary to various polygonal bin shapes (e.g., rectangular, square, pentagonal, hexagonal, etc.).

In other embodiments, the control mechanism may be an electronic control system that includes an extendable arm operated by an electronic controller having a pre-programmed algorithm for adjusting the distance between the one or more extendable-retractable arms and the interior wall of the bin. For example, the one or more extendable-retractable arms may be electronically controlled telescoping arms. In other examples, the sprayer manifolds may be attached to a threaded bore member (e.g., a ball screw nut) that is engaged with a screw member. In such embodiment, the threaded bore member is engaged with the threads of screw member and is configured to move along the screw member as the screw member turns. A motor (e.g. a servo motor) is engaged with the screw member, and may be operable to spin the screw in either direction in order draw the threaded bore member along the screw member and thereby move the spraying manifold proximally and distally as the spraying apparatus spins within the agricultural bin. It is to be appreciated that rotation of the screw member in one direction will cause the spraying mechanism to move distally to accommodate a greater radial distance of the interior wall of the bin, and rotation in the opposite direction will cause the spraying mechanism to move proximally along the lever member to accommodate a lesser radial distance of the interior wall of the bin. Other electronically controlled extension mechanisms are contemplated within the scope of the invention.

In other embodiments, the extendable arm may include an electronic camming system that extends the arm into the corners of the bin. The control mechanism may be an electronic control system that includes electromechanical programming stored on an electronic controller for operating the electronic camming system. The controller may include a pre-programmed algorithm for adjusting the distance between the one or more extendable-retractable portions of the extendable arms and the interior wall of the bin (e.g., in a corner). The extendable-retractable portions may be connected to a rotating portion of the arm by parallel-motion linkage bars or a sliding linkage (e.g., a track on the rotating portion and following pins in the extendable retractable portion, or vice versa) to allow the extendable portion to move radially in and out at a pre-determined interval. The position of the extendable-retractable portions along the rotating arm may be actuated by a chain or belt mechanism, such as a belt drive transmission. The extendable-retractable portion may include at least one sprocket or other device that engages with the chain or belt and a cam such that the movement of the chain moves the extendable arm proximally and distally with respect to the static arms. The cam mechanism may be connected to a sprocket (a rotor) that is rotated by the chain or belt, and may rotate with the sprocket. The cams may be bracket like structures connected to the sprocket that connect to the extendable portions of the rotating arms by a rigid bar linkage that maintains a constant distance between the cam and the connection point of the bar linkage to the extendable portion of the rotating spray arm. In other embodiments, the cam may be a plate-style cam with a pin or other connection mechanism to engage the extendable portion of the spraying arm, such that the cam is able to both push the extendable portion out and draw it back in depending on the rotational direction of the sprocket and cam. In other embodiments, the actuation mechanism may be a driving rod connected to the sprocket at a predetermined position on the sprocket at its proximal end and to the extendable portion of the spray arm at a second predetermined position, such that the pushes the extendable portion radially outward when the sprocket is rotated in a first rotational direction and pulls the extendable arm inward when the sprocket is rotated in a second rotational direction. As the extendable portions move proximally and distally, the spraying manifold moves proximally and distally with the extendable-retractable portion as the spraying apparatus spins within the agricultural bin.

The rotational motion of the sprocket and thus the radial movement of the extendable arm may be precisely controlled. The chain may be driven by an electronic camming motor (e.g., a stepper motor, a Servo, etc.) in mechanical connection therewith. The electronic camming motor may be controlled by the controller with electronic camming programming executed by the controller to activate the electronic camming motor to move the chain in both rotational directions to extend and retract the extendable-retractable portion as the rotating arm moves around the interior of an agricultural bin. The movement of the chain in one direction may cause the spraying mechanism to move distally to accommodate a greater radial distance of the interior wall of the bin, and movement of the chain in the opposite direction may cause the spraying mechanism to move proximally along the rotating arm to accommodate a lesser radial distance of the interior wall of the bin. The movement of the extendable portion of the spray arm may be governed by the activation of the electronic camming motor according to the programming executed by the controller.

The electronic camming programming may be governed by a timing ratio, where a single movement cycle of the of the electronic cam motor is conducted at a constant rotational speed that equal to the time required for the rotational arm to move through a particular portion of a bin. For example, in the case of a square bin, there are four individual sections of the bin that have the same shape and dimensions (each quadrant) and the same electronic camming operation moving the extendable arm in the same pattern can be applied to each portion. In this example, one electronic camming operation can be performed for each quadrant, resulting in a timing ratio between the electronic camming operation and one full rotation of the rotating spraying arm of 4:1. In other examples, the bin may have another shape (e.g., hexagonal) with a different number of individual sections of the same shape (e.g., six equal wedges) and the timing ratio between the electronic camming operation and one full rotation of the rotating spraying arm may reflect the particular bin shape (e.g., a ratio of 6:1). In further embodiments, the bin may have a shape that requires different patterns of extension and retraction of the extendable portion of the spraying arm. For example, in the case of a rectangular bin, the bin, the electronic camming programming can be approached in terms of quadrants. However, the pattern of radial distances to which the extendable portion extends changes from one quadrant to the next—if a first quadrant starts with the shortest radial distance of the centroid of the rectangle (i.e., to the long side of the rectangle), it will end with a longer radial distance, and the next quadrant starts at that longer distance and ends with the shortest radial distance. In such cases the electronic camming programming may have a different pattern of activating the electronic cam motor for each quadrant or section of the bin shape in order to maintain the extendable portion of the spraying arm at a substantially constant predetermined distance from the wall of the bin (e.g., a constant distance with minor fluctuations of less than about a centimeter).

The one or more spraying manifolds may be in fluid connection with a pressurized water supply, e.g., a hose or pipe that feeds through the rotating shaft so that the hose is not twisted by the rotational movement of the rotating spraying apparatus. The hose may provide water at a pressure sufficient to maintain fluid pressure at the plurality of spraying heads in a range of about 200 psi to about 4000 psi. The plurality of spraying heads may be in aligned on a single plane with spraying heads being directed at 90° relative to the surfaces of the interior walls of the bin. Some of the plurality of spraying heads may be arranged along a portion of the spraying manifold that is parallel to the floor of the bin, and another portion of the plurality of spraying heads may be arranged along a portion of the spraying manifold that is parallel to the sidewalls of the bin.

Water may be pumped to the plurality of spraying heads at high pressure to dislodge and wash away debris from the interior of the bin, which may then flow downward out of the bin with gravity. The rotating spraying apparatus may be supplied with water by a high-pressure water pump driven by an electric or gas motor, allowing for pressures ranging up to 4000 psi. The water spray pattern generated by the rotating spraying assembly is not only effective in reaching all portions of the interior tank surface, but by sweeping over the surface in rotating fashion provides an energetic stream that dislodges partially adhered particulate material and efficiently cleans the bin with a relatively small quantity of water.

The rotation of the rotating axial shaft may be driven by a motor engaged with the axial shaft by belt, chain, or other mechanism. For example, an electric motor or servo may be connected to a sprocket or other receiver on the axial shaft by a belt or chain. In other embodiments, the rotation of the axial shaft may be driven by the flow of pressurized water through the shaft. In some embodiments, the passage through the rotating axial shaft may include spiral finning or other angled, high surface area structures that are struck by the high-pressure water passing through the rotating axial shaft, thereby driving rotation of the axial shaft. The axial shaft may have a low friction bearing engaged with the plate or frame structure of the control mechanism to allow the axial shaft to rotate with a low coefficient of friction.

The rotating spraying apparatus may be incorporated into a larger bin cleaning system that delivers bins to a wash station in which the rotating spraying apparatus is positioned. The bin cleaning system may include a conveying system that passes the bin between stations within the bin cleaning system. The bins may be loaded into loading bay, which may have a conveyor track on which the unwashed bin may be positioned. The conveyor may advance the bin along the track through an initial washing station that includes static spraying nozzles that perform an initial gross cleaning of the bin to dislodge loose debris that can be easily removed from the interior walls of the bin. The bin may be subsequently engaged with a bin inverting mechanism having a mechanical member operable to clasp the bin and raise and invert the bin, and then place the bin over the rotating sprayer apparatus located in the main washing station. The inverting mechanism may place the bin in the main washing station such that the bin is upside down or substantially inverted at an oblique angle, such that the fluid sprayed into the bin drains by gravity flow. In other embodiments, the bin may be passed into the main washing station and the rotating spraying apparatus may be lowered into the bin from above the position of the bin in the main washing station.

Once the bin is in place, the rotating spraying apparatus may be rotated through the interior of the bin at least 90°, depending on the number of extendable rotating arms and spraying manifolds included thereon. Additional rotations may be made depending on the preferences of the user and the level of difficulty of removing the particular kind of debris from the interior of the bin. The main washing station may include additional spray nozzles to wash the exterior of the bin. For example, the main washing station may include static or oscillating spraying nozzles located over the bin and at each of the lateral sides of the bin to wash the exterior walls thereof.

The bin may be removed from the main spraying station by a second bin inverting mechanism. The second bin inverting mechanism may be operable to clasp the bin and raise and invert the bin, and then place the bin upside up on the conveying track to allow the bin to be passed through the distal end of the cleaning system, where it may be collected for re-use. The cleaning system may include a final set of spraying nozzles near the distal end to provide a final cleaning and rinsing step.

The bin washing system may include an adjustable seat for receiving the bins in the washing station. Agricultural bins have varying depths, and adjustable seat can be raised or lowered to accommodate bins of varying depths, allowing the spraying arms to be appropriately spaced from floor of the bin. In some embodiments, the adjustable seat may have a manual mechanical adjustment mechanism. In other embodiments, the adjustable seat may be actuated by an electric motor (e.g., a stepper motor, servo, etc.) and may be controlled by the controller. For example, the controller may be pre-programmed to adjust both (1) the electronically controlled sprayer arms to follow a particular pattern for extending the extendable-retractable portions of the sprayer arms that corresponds to the internal geometry of the sides of the bin and (2) the position of the adjustable seat to a position that allows the sprayer arms to be appropriately spaced from the bottom of the bin.

The bin washing system may also include bin stabilizers that hold the bin in place in the washing station, preventing the bin from being ejected or displaced from its seated position in the washing station by the pressure applied by the spraying arms. The bin stabilizers may be mechanical, hydraulic, or electrically actuated clamps or pistons that contact and apply compressive force to opposite sides of the bin to pinch the bin between the stabilizers and hold the bin in place. In other embodiments, the bin stabilizers may be bars or plates are positioned over the bin during a washing operation.

The bin washing system of the present invention may be operable to clean a plurality of bins in succession, thereby providing an automated and efficient bin washing system that reduces overall costs of the bin washing process and effectively removes debris and contamination from the bins, while using water conservatively and efficiently. The bin washing system may use just water as a cleaning fluid, or it may include a solution that includes cleaning agents such as disinfectants, soaps, detergents, bleach, anti-fungal compounds, anti-biotic compounds, and other sterilizing and cleaning materials.

In some embodiments, the present invention relates to an apparatus for washing the interior of a polygonal bin, comprising a guide structure having a pre-determined track; at least one articulating arm mechanically engaged with said track; a central rotational member that rotates the at least one articulating arm with respect to the guide structure and predetermined track; and a spraying member attached to said at least one articulating arm, wherein the radial distance of the spraying member from the central rotational member changes as the articulating arm rotates around the central rotational member. The spraying member may include a first pipe that is parallel to the floor of the polygonal bin when said apparatus is positioned within the agricultural bin and a second pipe that is parallel to the sidewalls of the polygonal bin when said apparatus is positioned within the polygonal bin. The apparatus may further include a first plurality of spraying heads positioned on said first pipe, and a second plurality of spraying heads on said second pipe. The apparatus may be operable to maintain said second plurality of spraying heads at a constant distance from said sidewalls of said polygonal bin as said at least one articulating arm is rotated through the interior of the agricultural bin. The apparatus may include at least two articulating arms, each engaged with said track. The bin may have a polygonal bottom and sidewalls orthogonally oriented relative to the polygonal bottom, and the pre-determined track may have a sinusoidal path that extends and retracts the articulating arm as it moves through the track in a pattern that is complementary to the interior perimeter of the polygonal bin, such that the articulating arm is maintained at a consistent distance from the interior of the sidewall of the polygonal bin as the rotating member rotates said articulating arm. The apparatus may further include a bin delivery mechanism operable to place said polygonal bin over said guide structure such that the polygonal bin is aligned with a complementary pattern of the pre-determined track. The apparatus may further include a second spraying mechanism for spraying the exterior of the polygonal bin when said polygonal bin is positioned over the guide structure. The second spraying mechanism may include spraying heads for spraying the exterior of the bottom of the bin and at least one lateral side of the bin. The second spraying mechanism may include spraying heads for spraying the exterior of the bottom of the bin and a plurality of lateral sides of the bin. The guide structure may be part of a platform structure, said platform structure having drainage holes therein for allowing fluid to drain from the apparatus. The central rotating member may have an axle and at least one driving arm that is fixedly attached to said axle. The at least one articulating arm may be operable to move in parallel along the length of the driving arm. The at least one articulating arm may be connected to said at least one driving arm by a parallel motion linkage. The central rotating member may include a fluid delivery pipe positioned concentrically with said axle for delivering a fluid to said spraying member.

In some embodiments, the present invention relates to a bin washing system comprising a wash station having a rotating spraying apparatus including a guide structure having a pre-determined track, at least one articulating arm mechanically engaged with said track, a central rotational member that rotates the at least one articulating arm thereby moving said articulating arm along the guide structure and predetermined track, and a spraying member attached to said at least one articulating arm, wherein the radial distance of the spraying member from the central rotational member changes as the at least one articulating arm rotates around the central rotational member; and an inverting mechanism for turning and placing said agricultural bins in said wash station. The spraying member may include a first pipe that is parallel to the floor of the agricultural bin when said apparatus is positioned within the agricultural bin and a second pipe that is parallel to the sidewalls of the agricultural bin when said agricultural bin is positioned within said wash station. The first plurality of spraying heads may be positioned on said first pipe, and a second plurality of spraying heads on said second pipe. The apparatus may be operable to maintain said second plurality of spraying heads at a substantially constant distance from said sidewalls of said agricultural bin as said at least one articulating arm is rotated through the interior of the agricultural bin. The apparatus may include at least two articulating arms, each engaged with said track. The bin may have a polygonal bottom and orthogonal sidewalls. The conveyor track for transporting agricultural bins within said system. The pre-determined track has a sinusoidal path that extends and retracts the articulating arm as it moves through the track in a pattern that is complementary to the interior perimeter of the polygonal bin, such that the articulating arm is maintained at a consistent distance from the interior of the sidewall of the polygonal bin as the rotating member rotates said articulating arm. The system may include a bin delivery mechanism operable to place said polygonal bin over said guide structure such that the polygonal bin is aligned with a complementary pattern of the pre-determined track. The second spraying mechanism for spraying the exterior of the polygonal bin when said polygonal bin is positioned over the guide structure. The second spraying mechanism includes spraying heads for spraying the exterior of the bottom of the bin and at least one lateral side of the bin. The second spraying mechanism includes spraying heads for spraying the exterior of the bottom of the bin and a plurality of lateral sides of the bin. The guide structure may be part of a platform structure, said platform structure having drainage holes therein for allowing fluid to drain from the apparatus. The central rotating member may have an axle and at least one driving arm that is fixedly attached to said axle. The at least one articulating arm may be operable to move in parallel along the length of the driving arm. The central rotating member may include a fluid delivery pipes positioned concentrically with said axle for delivering a fluid to said spraying member. The at least one articulating arm may be connected to said at least one driving arm by a parallel motion linkage. The post-wash bin-stacking mechanism may be operable to vertically stack the polygonal bins in a vertical stack adjacent to the wash station.

In some embodiments, the present invention relates to an apparatus for washing the interior of a polygonal bin, comprising at least one oscillating arm; a central rotational member that rotates the at least one oscillating arm; and a spraying member attached to said at least one oscillating arm, wherein the radial distance of the spraying member from the central rotational member changes as the oscillating arm rotates around the central rotational member. The spraying member may include a first pipe that is parallel to the floor of the polygonal bin when said apparatus is positioned within the agricultural bin and a second pipe that is parallel to the sidewalls of the polygonal bin when said apparatus is positioned within the polygonal bin. The apparatus may further include a first plurality of spraying heads positioned on said first pipe, and a second plurality of spraying heads on said second pipe. The apparatus may be operable to maintain said second plurality of spraying heads at a constant distance from said sidewalls of said polygonal bin as said at least one oscillating arm is rotated through the interior of the agricultural bin. The apparatus may include at least two oscillating arms. The bin may have a polygonal bottom and sidewalls orthogonally oriented relative to the polygonal bottom, and the apparatus is operable to maintain said oscillating arm at a consistent distance from the interior of the sidewall of the polygonal bin as the rotating member rotates said oscillating arm. The apparatus may further include a second spraying mechanism for spraying the exterior of the polygonal bin when said polygonal bin is positioned over the guide structure. The second spraying mechanism may include spraying heads for spraying the exterior of the bottom of the bin and at least one lateral side of the bin. The second spraying mechanism may include spraying heads for spraying the exterior of the bottom of the bin and a plurality of lateral sides of the bin. The apparatus may include a platform structure, said platform structure having drainage holes therein for allowing fluid to drain from the apparatus. The central rotating member may include a fluid delivery pipe positioned concentrically with said axle for delivering a fluid to said spraying member.

In some embodiments, the present invention relates to a method for washing containers, comprising placing a bin having a polygonal base and sidewalls substantially orthogonal to said polygonal base over a wash station, said wash station comprising a guide structure having a pre-determined track, at least one articulating arm mechanically engaged with said track, a central rotational member that in mechanical connection with the at least one articulating arm, and a spraying member attached to said at least one articulating arm; rotating said central rotating member thereby moving said articulating arm along the guide structure and predetermined track, wherein the guide structure maintains a radial distance of the spraying member from said sidewalls of said bin as the at least one articulating arm rotates around the central rotational member; and spraying the interior sidewalls and interior surface of the base of the bin with said spraying member. The spraying member may include a first pipe that is parallel to the floor of the bin when said apparatus is positioned within the bin and a second pipe that is parallel to the sidewalls of the bin when said agricultural bin is positioned within said wash station. The first pipe may include a first plurality of spraying heads, and the second pipe may include a second plurality of spraying heads. The apparatus may be operable to maintain said second plurality of spraying heads at a substantially constant distance from said sidewalls of said bin as said at least one articulating arm is rotated through the interior of the bin. The apparatus may include at least two articulating arms, each engaged with said track. The method may further include conveying a plurality of bins along a conveyor track ns to said wash station. The method may further include using a bin delivery mechanism operable to receive bins from said conveyor track one at a time and place a single polygonal bin over said guide structure such that the polygonal bin is aligned with a complementary pattern of the pre-determined track. The pre-determined track may have a sinusoidal path that extends and retracts the articulating arm as it moves through the track in a pattern that is complementary to the interior perimeter of the polygonal bin, such that the articulating arm is maintained at a consistent distance from the interior of the sidewall of the polygonal bin as the rotating member rotates said articulating arm. The method may further include simultaneously spraying the exterior of said polygonal bine with a second spraying mechanism when said polygonal bin is positioned over the guide structure and said spraying member is spraying the interior of said bin. The second spraying mechanism may include spraying heads for spraying the exterior of the bottom of the bin and at least one lateral side of the bin. The second spraying mechanism may include spraying heads for spraying the exterior of the bottom of the bin and a plurality of lateral sides of the bin. The guide structure may be part of a platform structure, said platform structure having drainage holes therein for allowing fluid to drain from the apparatus. The central rotating member may have an axle and at least one driving arm that may be fixedly attached to said axle. The at least one articulating arm may move in parallel along the length of the driving arm. The central rotating member may include a fluid delivery pipes positioned concentrically with said axle for delivering a fluid to said spraying member. The at least one articulating arm may be connected to said at least one driving arm by a parallel motion linkage. The method may further include vertically stacking a plurality of bins adjacent to the wash station using an automated post-wash bin-stacking mechanism.

In some embodiments, the present invention relates to a method of cleaning containers comprising spraying the interior of a bin having a polygonal base and sidewalls that are substantially orthogonal to the polygonal base with a spraying apparatus having a guide structure having a predetermined track, at least one articulating arm following arm having a following pin nested within said track, a central rotational member that in mechanical articulating connection with the at least one articulating following arm, and a spraying member attached to said at least one articulating following arm; rotating said central rotating member thereby moving said articulating following arm along the predetermined track such that the following pin follows predetermined track to oscillate the articulating following arm such that it maintains a substantial constant distance of the spraying member from the varying said sidewalls of said bin. The spraying member may include a first pipe that is parallel to the polygonal base of the bin when said apparatus is positioned within the bin and a second pipe that is parallel to the sidewalls of the bin when said spraying apparatus is positioned within said bin. The first pipe may include a first plurality of spraying heads, and the second pipe may include a second plurality of spraying heads. The apparatus may be operable to maintain said second plurality of spraying heads at a substantially constant distance from said sidewalls of said bin as said at least one articulating arm is rotated through the interior of the bin. The apparatus may include at least two articulating following arms, each having a following pin nested within said track. The method include utilizing a bin delivery mechanism operable to place a single polygonal bin over said guide structure such that the polygonal bin is aligned with a complementary pattern of the pre-determined track. The pre-determined track has a sinusoidal path that extends and retracts the articulating following arm as the following pin moves through the track in a pattern that is complementary to the interior perimeter of the polygonal bin, such that the articulating arm is maintained at a consistent distance from the interior of the sidewalls of the polygonal bin as the rotating member rotates said articulating following arm. The method may further include simultaneously spraying the exterior of said polygonal bine with a second spraying mechanism when said polygonal bin is positioned over the guide structure and said spraying member is spraying the interior of said bin. The second spraying mechanism may include spraying heads for spraying the exterior of the bottom of the bin and at least one lateral side of the bin. The second spraying mechanism may include spraying heads for spraying the exterior of the bottom of the bin and a plurality of lateral sides of the bin. The guide structure may be part of a platform structure, said platform structure having drainage holes therein for allowing fluid to drain from the apparatus. The central rotating member may have an axle and at least one driving arm that is fixedly attached to said axle. The at least one articulating arm may move in parallel along the length of the driving arm. The central rotating member may include a fluid delivery pipe positioned concentrically with said axle for delivering a fluid to said spraying member. The method at least one articulating following arm may be connected to said at least one driving arm by a parallel motion linkage.

In some embodiments, the present invention relates to an apparatus for washing the interior of an agricultural bin, comprising a guide structure having a pre-determined track; at least one articulating arm mechanically engaged with said track; a central rotational member that rotates the at least one articulating arm with respect to the guide structure and predetermined track; and a spraying member attached to said at least one articulating arm, wherein the radial distance of the spraying member from the central rotational member changes as the articulating arm rotates around the central rotational member. The spraying member may include a first pipe that is parallel to the floor of the agricultural bin when said apparatus is positioned within the agricultural bin and a second pipe that is plurality parallel to the sidewalls of the agricultural bin when said apparatus is positioned within the agricultural bin. The apparatus may further comprise a first plurality of spraying heads positioned on said first pipe, and a second plurality of spraying heads on said second pipe. The apparatus may be operable to maintain said second plurality of spraying heads at a constant distance from said sidewalls of said agricultural bin as said at least one articulating arm is rotated through the interior of the agricultural bin. The apparatus may include at least two articulating arms, each engaged with said track. The bin may have a square bottom and orthogonal sidewalls.

In further embodiments, the present invention relates to a bin washing system comprising a conveyor track for transporting agricultural bins said system; an inverting mechanism for turning said agricultural bins; and a wash station having a rotating spraying apparatus including a guide structure having a pre-determined track, at least one articulating arm mechanically engaged with said track, a central rotational member that rotates the at least one articulating arm with respect to the guide structure and predetermined track, and a spraying member attached to said at least one articulating arm, wherein the radial distance of the spraying member from the central rotational member changes as the articulating arm rotates around the central rotational member. The spraying member may include a first pipe that is parallel to the floor of the agricultural bin when said apparatus is positioned within the agricultural bin and a second pipe that is plurality parallel to the sidewalls of the agricultural bin when said apparatus is positioned within the agricultural bin. The apparatus may further comprise a first plurality of spraying heads positioned on said first pipe, and a second plurality of spraying heads on said second pipe. The apparatus may be operable to maintain said second plurality of spraying heads at a constant distance from said sidewalls of said agricultural bin as said at least one articulating arm is rotated through the interior of the agricultural bin. The apparatus may include at least two articulating arms, each engaged with said track. The bin may have a square bottom and orthogonal sidewalls.

DETAILED DESCRIPTION

Figure 1:
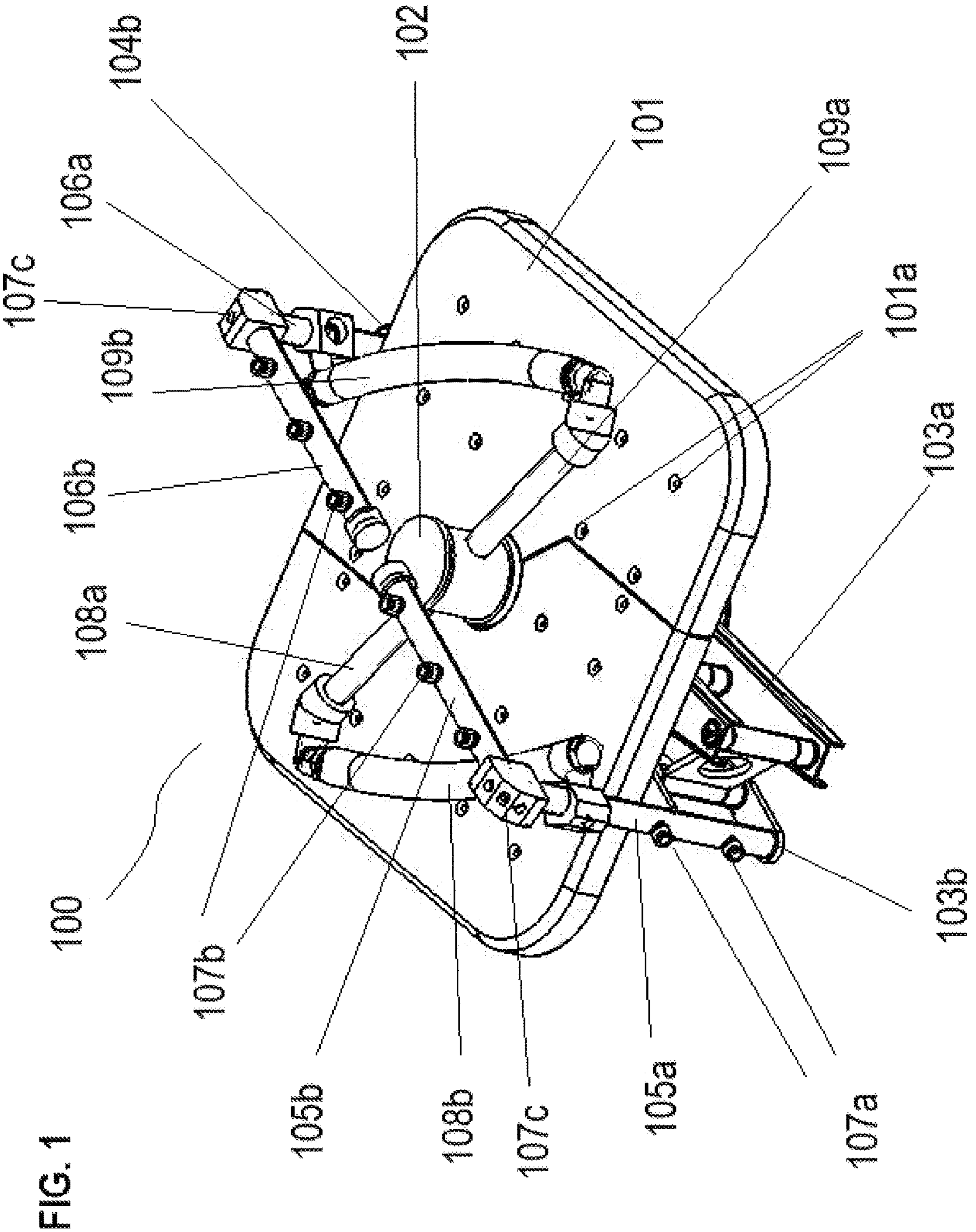
FIG. 1 is a perspective view of a rotating spraying apparatus according to an embodiment of the present invention.
Figure 2:
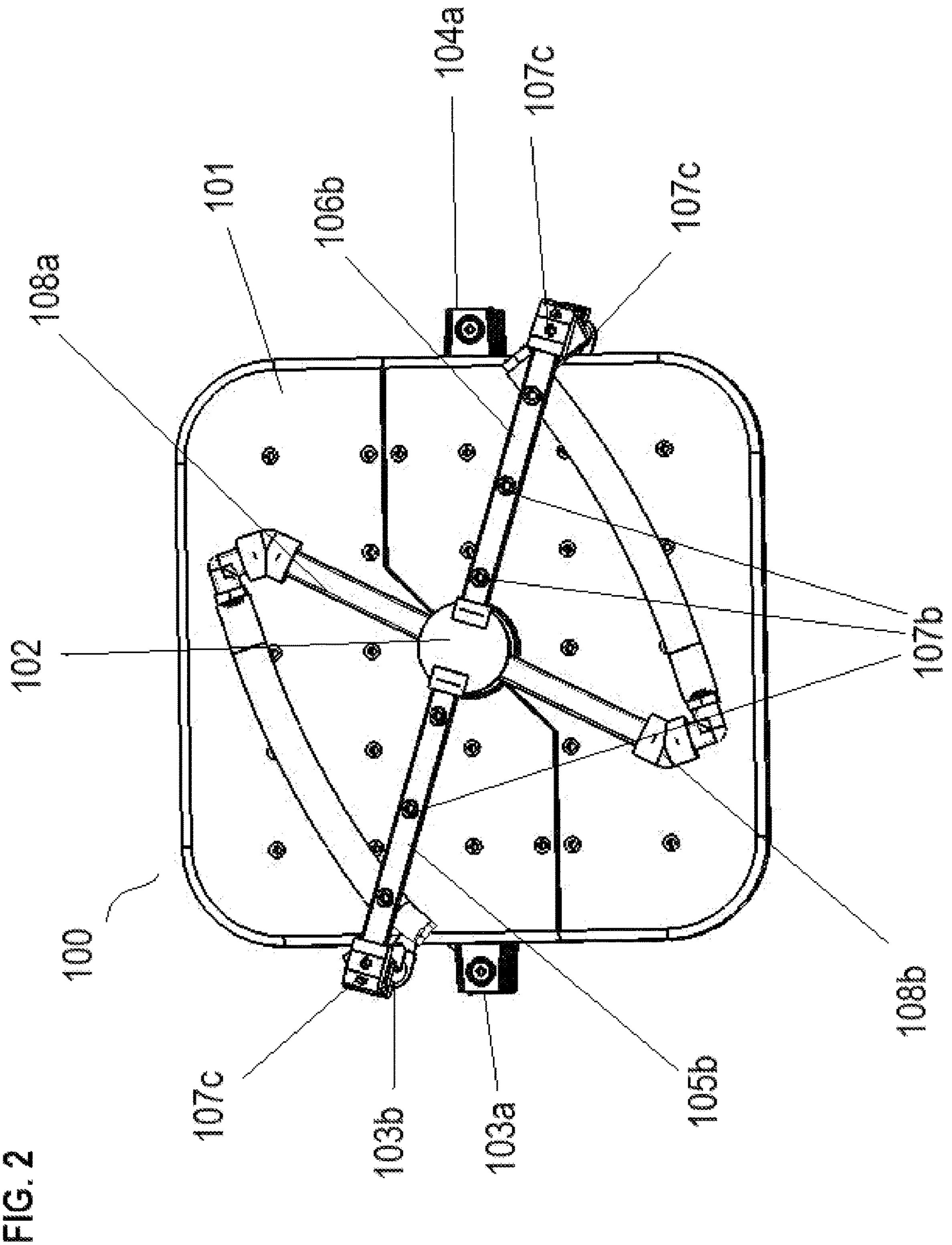
FIG. 2 is an overhead view of a rotating spraying apparatus according to an embodiment of the present invention.
Figure 3:
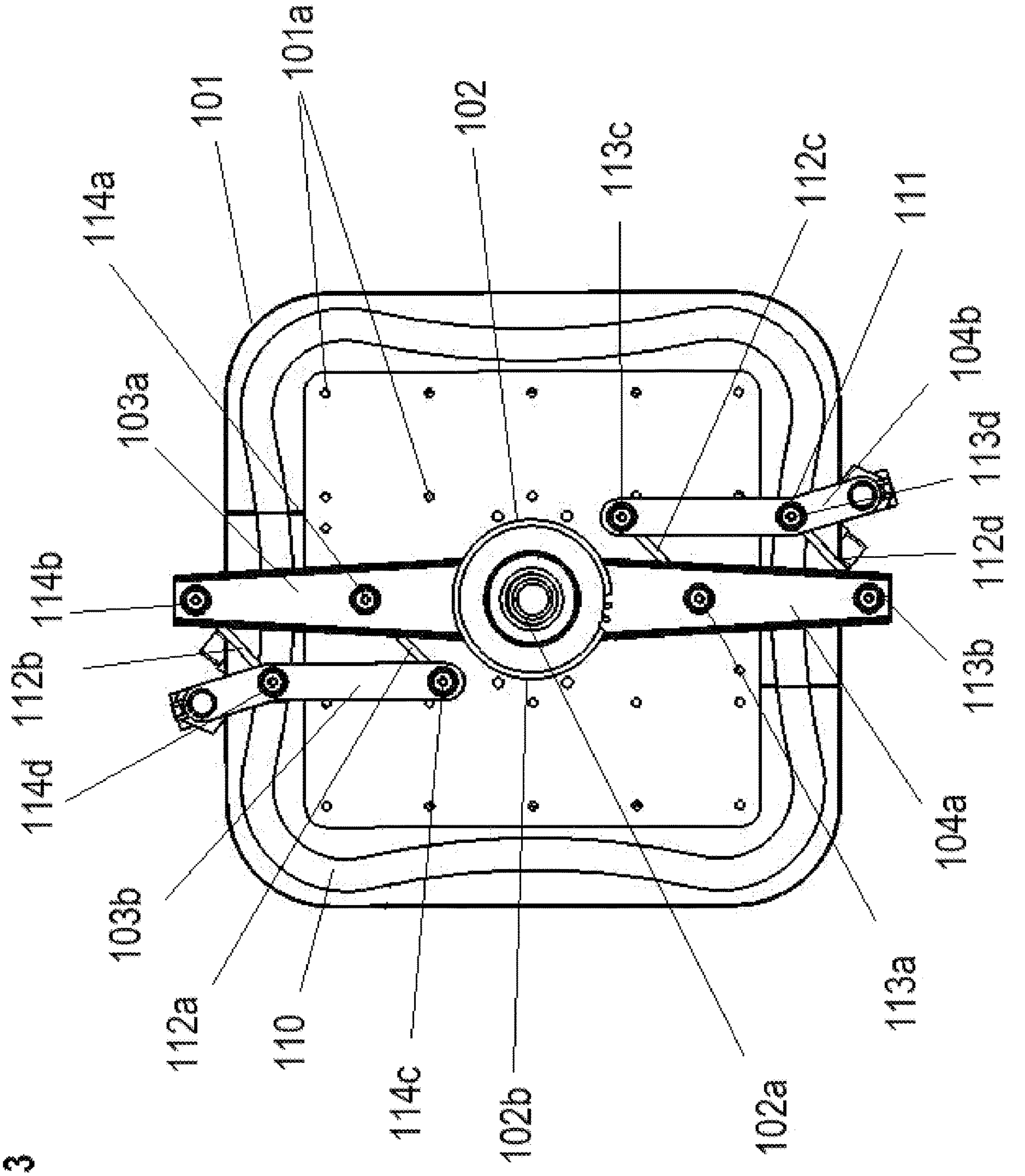
FIG. 3 is a bottom view of a rotating spraying apparatus according to an embodiment of the present invention.

Reference will now be made in detail to certain embodiments of the invention, examples of which are illustrated in the accompanying drawings. While the invention will be described in reference to these figures and certain implementations and examples of the embodiments, it will be understood that such implementations and examples are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. References to various features of the "present invention" throughout this document do not mean that all claimed embodiments or methods must include the referenced features. It will be apparent to one skilled in the art that the present invention may be practiced without these specific details or features.

Reference will be made to the exemplary illustrations in the accompanying drawings, and like reference characters may be used to designate like or corresponding parts throughout the several views of the drawings.

The present invention relates to novel automated washing systems for removing debris from reusable containers. More specifically, the present invention pertains to a method for automated washing systems having a rotating spraying apparatus that can be maintained at a constant distance from the interior surfaces of polygonal bins such that all interior surfaces are equally and thoroughly cleaned, despite irregularly and varying radii of the sidewalls of the container.

FIGS. 1-4 provide perspective, top, bottom, and side views of an exemplary rotating spraying apparatus 100 for a bin washing system according to the present invention. The rotating spraying apparatus includes a platform 101 on which the structures of the spraying apparatus 100 are anchored. The platform 101 acts as the guide structure of the spraying apparatus, as it includes a pre-determined track 110 on a bottom side thereof for guiding oscillations of the articulating arms. A rotating axial shaft 102 may be positioned in a center of the platform 101 and may pass through a central passage in the platform and be operable to rotate in the central passage. The platform may include one or more drainage holes 101*a* to allow fluid from the rotating spraying apparatus to drain from the bin and rotating spraying apparatus.

The rotating spraying apparatus 100 may include arm assemblies positioned below the platform that rotate with the axial shaft 102. Each arm assembly may include a static arm that is fixedly connected to the rotating axial shaft 102 (and thus rotates with the rotating axial shaft 102) and an articulating arm that includes an articulating connection with the static arm allowing the articulating arm to move in and out radially and in parallel to the static arm. The spraying apparatus 100 includes a first static arm 103*a* and first articulating arm 103*b* connected thereto, and a second static arm 104*a* and a second articulating arm 104*b* attached thereto. In this embodiment, the articulating arms are attached to the static arms by parallel-motion linkages that include parallel pivoting bars or rods that allow the articulating arms to slide and oscillate radially in and out in parallel to the static arms. Specifically, static arm 103*a* is connected to articulating arm 103*b* by parallel pivoting bars 112*a* and 112*b*. Pivoting bar 112*a* is coupled to static arm 103*a* by pivoting joint 114*a* and to articulating arm 103*b* by pivoting joint 114*c*. Pivoting bar 112*b* is coupled to static arm 103*a* by pivoting joint 114*b* and to articulating arm 103*b* by pivoting joint 114*d*. The pivoting bars 112*a* and 112*b* are parallel or substantially parallel and remain in their parallel arrangement as they pivot and swing as the articulating arm 103*b* slides past the static arm 103*a*. Similarly, static arm 104*a* is connected to articulating arm 104*b* by parallel pivoting bars 112*c* and 112*d*. Pivoting bar 112*c* is coupled to static arm 104*a* by pivoting joint 113*a* and to articulating arm 104*b* by pivoting joint 113*c*. Pivoting bar 112*d* is coupled to static arm 104*a* by pivoting joint 113*b* and to articulating arm 104*b* by pivoting joint 113*d*. The pivoting bars 112*c* and 112*d* are parallel or substantially parallel and remain in their parallel arrangement as they pivot and swing as the articulating arm 104*b* slides past the static arm 104*a*.

Figure 4:
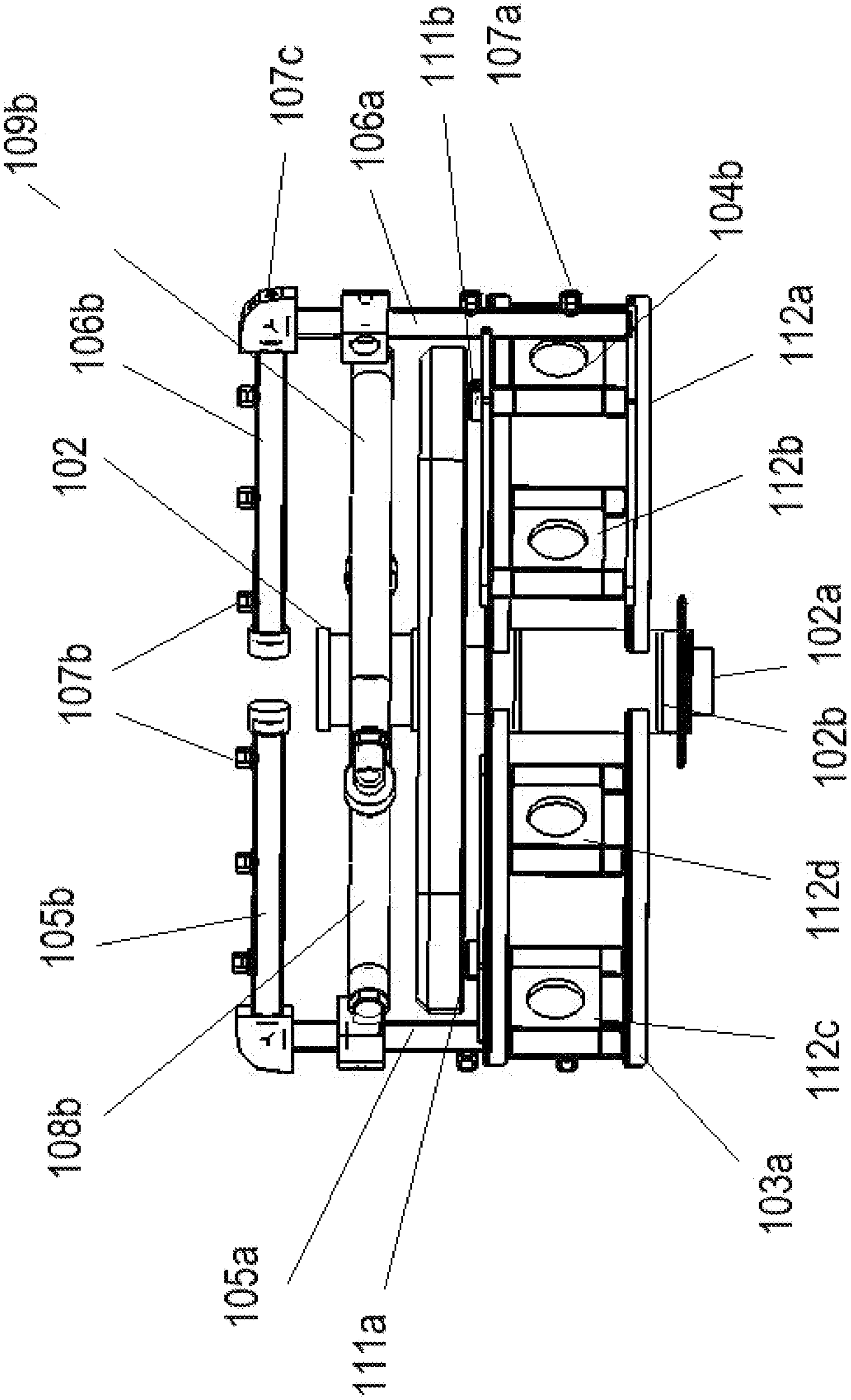
FIG. 4 is a side view of a rotating spraying apparatus according to an embodiment of the present invention.

Each of the articulating arms 103*b* and 104*b* are engaged with the pre-determined track 110 by a following roller or pin. As shown in FIG. 4, articulating arm 103*b* includes a roller 111*a* that is mechanically connected to the articulating arm 103*b* and that is nested at an opposite end in the pre-determined track 110. The following roller 111*a* is pushed in and pulled out according to the path of the track 110, which in turn moves the articulating arm 103*b* radially inward and outward in an oscillating motion. Similarly, articulating arm 104*b* includes a roller 111*b* that is mechanically connected to the articulating arm 104*b* and that is nested at an opposite end in the pre-determined track 110. The following roller 111*b* is pushed in and pulled out according to the path of the track 110, which in turn moves the articulating arm 104*b* radially inward and outward in an oscillating motion.

The path of the track 110 is sinusoidal because the radial distance from the axial shaft 102 of the sidewalls of a polygonal (e.g., square) bin in which the rotating spraying apparatus is positioned increases as the spraying manifold moves toward the corners of the bin. The path of the track 110 curves outward away from the axial shaft 102 such that the spraying manifold can be maintained at a consistent distance from the sidewalls of the bin. According to the present invention, the path of the track may be complementary to the shape of the base of a particular polygonal bin. For example, the track 110 of rotating spraying apparatus 100 is complementary to a bin have a square base. The path of the predetermined path can and the shape of the platform of the rotating spraying apparatus may be adapted to various polygonal shapes (e.g., adapted to various kinds of bins).

Each of the articulating arms 103*b* and 104*b* are connected to a spraying manifold that produces jets for spraying the interior surfaces of a container. Each of the spraying manifolds may have a first vertical pipe and a second horizontal pipe that are in fluid communication. As shown in FIG. 1, a vertical pipe 105*a* is connected at its inferior end to articulating arm 103*b* and is connected at its superior end to horizontal pipe 106*a*. Similarly, vertical pipe 106*a* is connected at its inferior end to articulating arm 104*b* and at its superior end to horizontal pipe 106*b*.

Each of the vertical and horizontal pipes of the spraying manifolds includes high pressure sprayer heads thereon for delivering a high pressure, high velocity fluid spray to the interior of the bins in which the spraying apparatus is positioned. The fluid may be delivered to the sprayer heads at a pressure in a range of about 200 psi to about 4000 psi, depending on the particular kind of debris that is to be washed out of the bins. The fluid may be supplied to the rotating spraying apparatus through the rotating axial shaft by a variable pressure pump operable to generate pressures up to 4000 psi. A pipe or hose may connect the pump with a fluid passage 102*a* of the axial shaft 102 to allow fluid communication between the pump and the axial shaft 102.

Each of the spraying manifolds may receive fluid from a feed pipe that connects the spraying manifold to the rotating axial shaft. As shown in FIG. 1, a feed pipe 108*a* is connected at its proximal end to and is in fluid communication with the rotating axial shaft 102, and is connected at its distal end to vertical pipe 105*a*. Similarly, a feed pipe 109*a* is connected at its proximal end to and is in fluid communication with the rotating axial shaft 102, and is connected at its distal end to vertical pipe 106*a*. Each of the feed pipes may include a distal flexible portion that allows some give and minor relative rotation between portions of the rotating spraying apparatus to avoid and reduce damage to linkages between the rotating axial shaft, the feed pipes the spraying manifolds, and the arm assemblies. As shown in FIG. 1, feed pipe 108*a* includes a distal flexible portion 108*b* that connects with the vertical pipe 105*a*. Similarly, feed pipe 109*a* includes a distal flexible portion 109*b* that connects with the vertical pipe 106*a*.

As shown in FIG. 1, vertical pipe 105*a* includes a plurality of horizontal spray heads 107*a*, and horizontal pipe 105*b* includes a plurality of vertical spray heads 107*b*. Similarly, vertical pipe 106*a* includes a plurality of horizontal spray heads 107*a* (obscured in FIG. 1), and horizontal pipe 106*b* includes a plurality of vertical spray heads 107*b*. The spraying manifolds may also include corner spraying jets positioned at the connection point between the vertical and horizontal pipes of the spraying manifold. The corner spraying jets provide a high pressure spray directly into the corner between floor and the sidewall of the bin. The plurality of corner spraying jets may be oriented at multiple angles such that high pressure fluid spray reaches directly into the corner between the sidewall and the floor of the bin and the areas immediately adjacent to the corner. As shown in FIG. 1, at a joint between the vertical pipe 105*a* and the horizontal pipe 105*b*, the spraying manifold includes a plurality of jets 107*c*. Similarly, a joint between the vertical pipe 106*a* and the horizontal pipe 106*b* includes a plurality of jets 107*c*.

The rotating spraying apparatus of the present invention may be incorporated into a larger bin washing system that delivers bins to a wash station in which the rotating spraying apparatus is positioned. The bin cleaning system may include a conveying system that passes the bin between stations within the bin cleaning system. The bins may be loaded into loading bay, which may have a conveyor track on which the unwashed bin may be positioned.

In some embodiments, the rotating spraying apparatus may like that shown in FIGS. 5A-5D 200 may include arm assemblies with extendable articulating arms 203B and 204B that are actuated by an electronic camming mechanism as an axial shaft 202 and arms 203A and 204A rotate. Each arm assembly may include a static arm that is fixedly connected to the rotating axial shaft 202 (and thus rotates with the rotating axial shaft 202 as it is driven by motor 230 via chain 230*a*) and an articulating arm that includes an articulating connection with the static arm allowing the articulating arm to move in and out radially and in parallel to the static arm. The spraying apparatus 200 includes a first static arm 203*a* and first articulating arm 203*b* connected thereto, and a second static arm 204*a* and a second articulating arm 204*b* attached thereto. The articulating arms may be attached to the static arms by parallel-motion linkages that include parallel pivoting bars or rods that allow the articulating arms to slide and oscillate radially in and out in parallel to the static arms, as described herein. Specifically, static arm 203*a* is connected to articulating arm 203*b* by parallel pivoting bars 212*a* and 212*b*. Pivoting bar 212*a* is coupled to static arm 203*a* by pivoting joint 214*a* and to articulating arm 203*b* by pivoting joint 214*c*. Pivoting bar 212*b* is coupled to static arm 203*a* by pivoting joint 214*b* and to articulating arm 203*b* by pivoting joint 214*d*. The pivoting bars 212*a* and 212*b* are parallel or substantially parallel and remain in their parallel arrangement as they pivot and swing as the articulating arm 203*b* slides past the static arm 203*a*. Similarly, static arm 204*a* is connected to articulating arm 204*b* by parallel pivoting bars 212*c* and 212*d*. Pivoting bar 212*c* is coupled to static arm 204*a* by pivoting joint 213*a* and to articulating arm 204*b* by pivoting joint 213*c*. Pivoting bar 212*d* is coupled to static arm 204*a* by pivoting joint 213*b* and to articulating arm 204*b* by pivoting joint 213*d*. The pivoting bars 212*c* and 212*d* are parallel or substantially parallel and remain in their parallel arrangement as they pivot and swing as the articulating arm 204*b* slides past the static arm 204*a*.

Figure 5A:
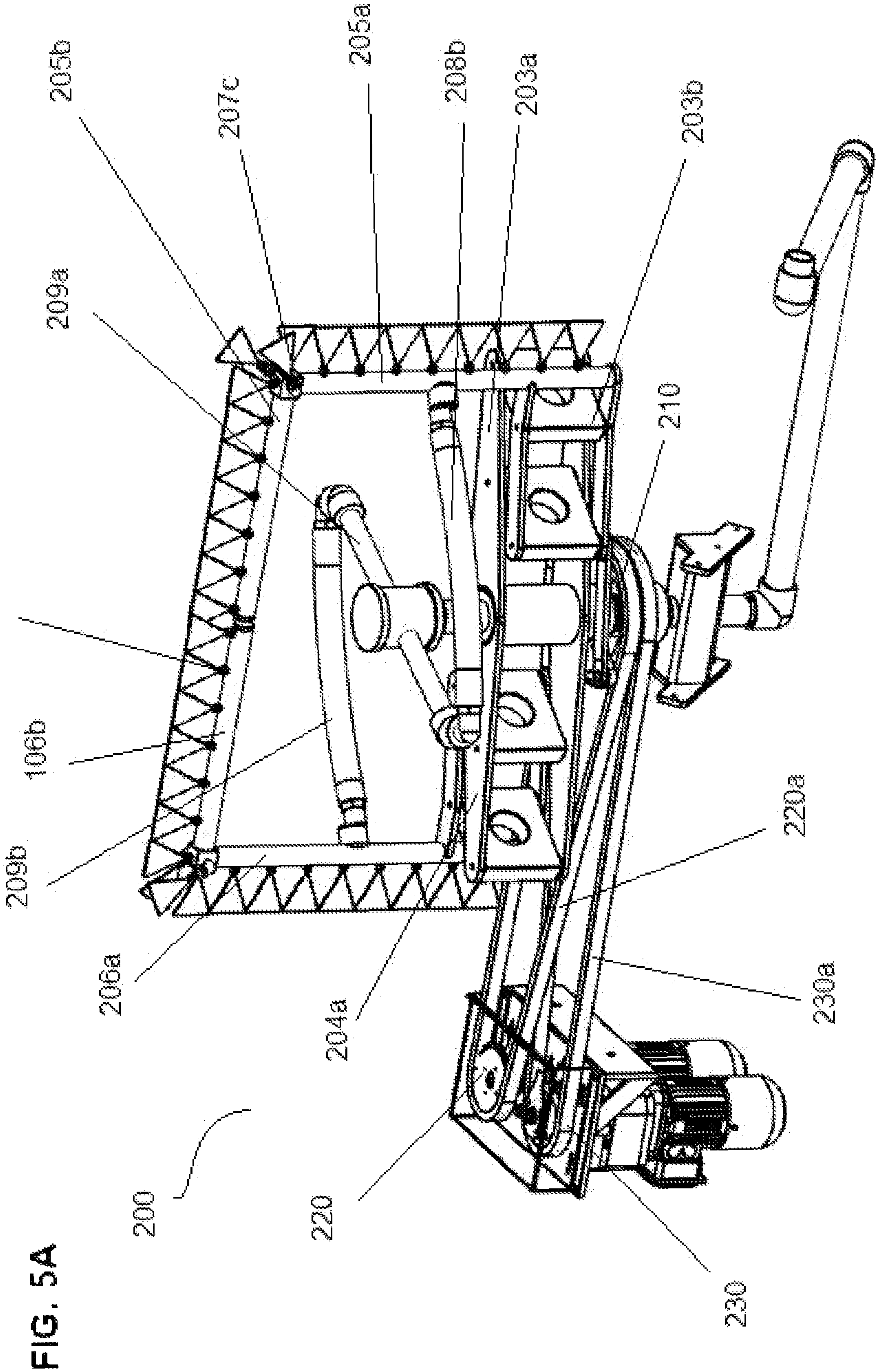
FIG. 5A is a perspective view of a rotating spraying apparatus according to an embodiment of the present invention.
Figure 5B:
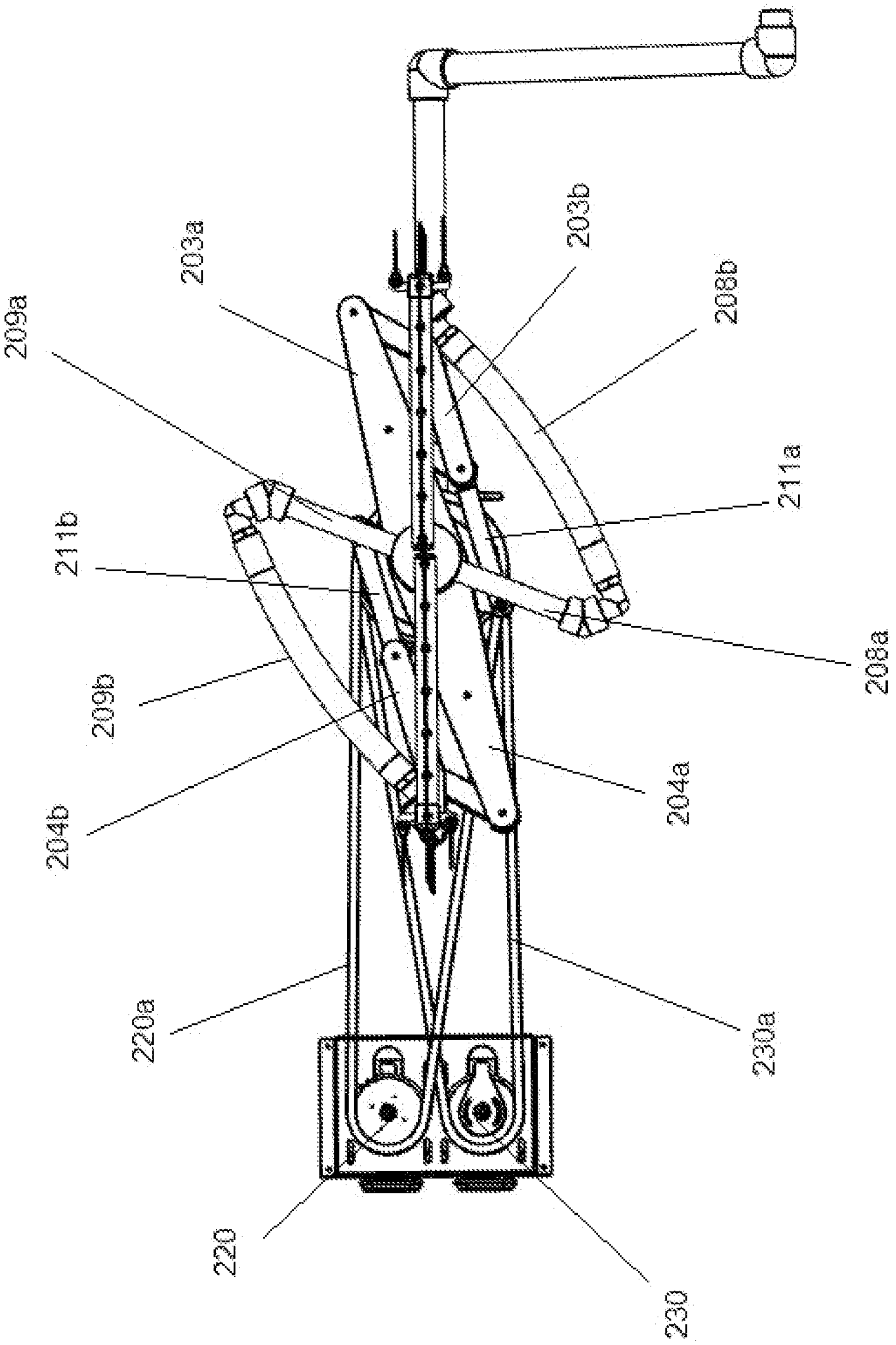
FIG. 5B is an overhead view of a rotating spraying apparatus according to an embodiment of the present invention.

Each of the articulating arms 203*b* and 204*b* are engaged with a cam 210*a* and cam 210*b* respectively. The cams may be connected to and rise above rotor 210 driven by electronic camming motor 220 by a chain 220*a*. The rotor 210 may be a toothed sprocket structure that allows the camming motor 220 to precisely control the rotational position of the rotor 210 based on the linear motion of the chain 220*a*. As shown in FIGS. 5A-5B, articulating arm 203*b* is connected to the cam 210*a* on rotor 210 by a linking bar 211*a*. As the rotor 210 is rotated by chain 220*a*, articulating arm 203*b* is moved radially inward and outward in an oscillating motion due to the bar linkage 211*a* to the cam 210*a*. Similarly, articulating arm 204*b* is mechanically connected to cam 210*b* by bar linkage 211*b*. As the rotor 210 is rotated by chain 220*a*, articulating arm 204*b* is moved radially inward and outward in an oscillating motion due to the bar linkage 211*b* to the cam 210*b*.

The radial distance from the axial shaft 202 of the sidewalls of a polygonal (e.g., square) bin in which the rotating spraying apparatus 200 is positioned increases as the spraying manifold moves toward the corners of the bin. The extendable articulating arms 203*b* and 204*b* move outward away from the axial shaft 202 such that the spraying manifold can be maintained at a substantially consistent distance from the sidewalls of the bin (e.g., with a minor variance of less than about 1 cm). According to the present invention, the path of the extendable articulating arms 203*b* and 204*b* may be complementary to the shape of the base of a particular polygonal bin. The path of the extendable articulating arms 203*b* and 204*b* may be adapted to various polygonal shapes (e.g., adapted to various kinds of bins).

Each of the articulating arms 203*b* and 204*b* are connected to a spraying manifold that produces jets for spraying the interior surfaces of a container. Each of the spraying manifolds may have a first vertical pipe and a second horizontal pipe that are in fluid communication. As shown in FIG. 5A, a vertical pipe 205*a* is connected at its inferior end to articulating arm 203*b* and is connected at its superior end to horizontal pipe 206*a*. Similarly, vertical pipe 206*a* is connected at its inferior end to articulating arm 204*b* and at its superior end to horizontal pipe 206*b*.

Each of the vertical and horizontal pipes of the spraying manifolds includes high pressure sprayer heads thereon for delivering a high pressure, high velocity fluid spray to the interior of the bins in which the spraying apparatus is positioned. The fluid may be delivered to the sprayer heads at a pressure in a range of about 200 psi to about 4000 psi, depending on the particular kind of debris that is to be washed out of the bins. The fluid may be supplied to the rotating spraying apparatus through the rotating axial shaft by a variable pressure pump operable to generate pressures up to 4000 psi. A pipe or hose may connect the pump with a fluid passage 202*a* of the axial shaft 202 to allow fluid communication between the pump and the axial shaft 202.

Each of the spraying manifolds may receive fluid from a feed pipe that connects the spraying manifold to the rotating axial shaft. As shown in FIG. 5A, a feed pipe 208*a* is connected at its proximal end to and is in fluid communication with the rotating axial shaft s02, and is connected at its distal end to vertical pipe 205*a*. Similarly, a feed pipe 209*a* is connected at its proximal end to and is in fluid communication with the rotating axial shaft 202, and is connected at its distal end to vertical pipe 206*a*. Each of the feed pipes may include a distal flexible portion that allows some give and minor relative rotation between portions of the rotating spraying apparatus to avoid and reduce damage to linkages between the rotating axial shaft, the feed pipes the spraying manifolds, and the arm assemblies. As shown in FIG. 5A, feed pipe 208*a* includes a distal flexible portion 208*b* that connects with the vertical pipe 205*a*. Similarly, feed pipe 209*a* includes a distal flexible portion 209*b* that connects with the vertical pipe 206*a*.

As shown in FIG. 5A, vertical pipe 205*a* includes a plurality of horizontal spray heads 207*a*, and horizontal pipe 205*b* includes a plurality of vertical spray heads 207*b*. Similarly, vertical pipe 206*a* includes a plurality of horizontal spray heads 207*a* (obscured in FIG. 5A), and horizontal pipe 206*b* includes a plurality of vertical spray heads 207*b*. The spraying manifolds may also include corner spraying jets positioned at the connection point between the vertical and horizontal pipes of the spraying manifold. The corner spraying jets provide a high-pressure spray directly into the corner between floor and the sidewall of the bin. The plurality of corner spraying jets may be oriented at multiple angles such that high pressure fluid spray reaches directly into the corner between the sidewall and the floor of the bin and the areas immediately adjacent to the corner. As shown in FIG. 5A, at a joint between the vertical pipe 205*a* and the horizontal pipe 205*b*, the spraying manifold includes a plurality of jets 207*c*. Similarly, a joint between the vertical pipe 206*a* and the horizontal pipe 206*b* includes a plurality of jets 207*c*.

The rotating spraying apparatus shown in FIGS. 5A-5D of the present invention may be incorporated into a larger bin washing system that delivers bins to a wash station in which the rotating spraying apparatus is positioned. The bin cleaning system may include a conveying system that passes the bin between stations within the bin cleaning system. The bins may be loaded into loading bay, which may have a conveyor track on which the unwashed bin may be positioned.

FIGS. 6A-9 show an exemplary bin washing system 1000 that includes a rotating spraying apparatus (e.g., system 100 or 200) incorporated into a bin washing station therein. The bin washing system 1000 includes a loading bay 1001 into which the bins may be loaded by a hand, a central washing station 1002, which includes the rotating spraying apparatus, and an exit passage 1003 from which the bins may be retrieved after washing. In some embodiments, the bin washing system 1000 may be a stationary system housed in a warehouse or other enclosure. In other embodiments, the bin washing system 1000 may be built on a trailer 1100 to allow the bin washing system 1000 to be mobile, enabling it, e.g., to be delivered to a farming operation needing produce bins to be cleaned for re-use or storage after harvesting.

As shown in FIG. 5B, the loading bay 1001 includes a prewashing spray array to rinse any loose debris off of the interior and exterior of a bin loaded in the loading bay 1001. The loading bay may include two horizontal spraying bars, including spray bar 1010*b* located near the top of the loading bay 1001 to spray the superior and interior portions of the bin and spray bar 1010*c* located near the bottom of loading bay 1001 to spray the lower exterior and bottom of the bin. The loading bay also includes two vertical spray bars that flank the lateral sides of the loading bay entrance, such that they provide spray to remove loose debris from the lateral sides of the bin. The loading bay further includes a drop-in spraying boom 1010*a* with a multi-directional spray head 1011*a* (see FIGS. 6-7 as well). The drop-in spraying boom 1010*a* is positioned on a rotating support pipe 1011*b* that also supply fluid to the spray 1011*a*. When a bin is positioned in the loading bay 1002, the drop-in spray boom 1010*a* may be lowered into the bin by rotating the spray boom 1010*a* down into the interior of the bin. Subsequently, fluid may be delivered to the spray head 1011*a* from the rotating support pipe 1011*b*.

Figure 5C:
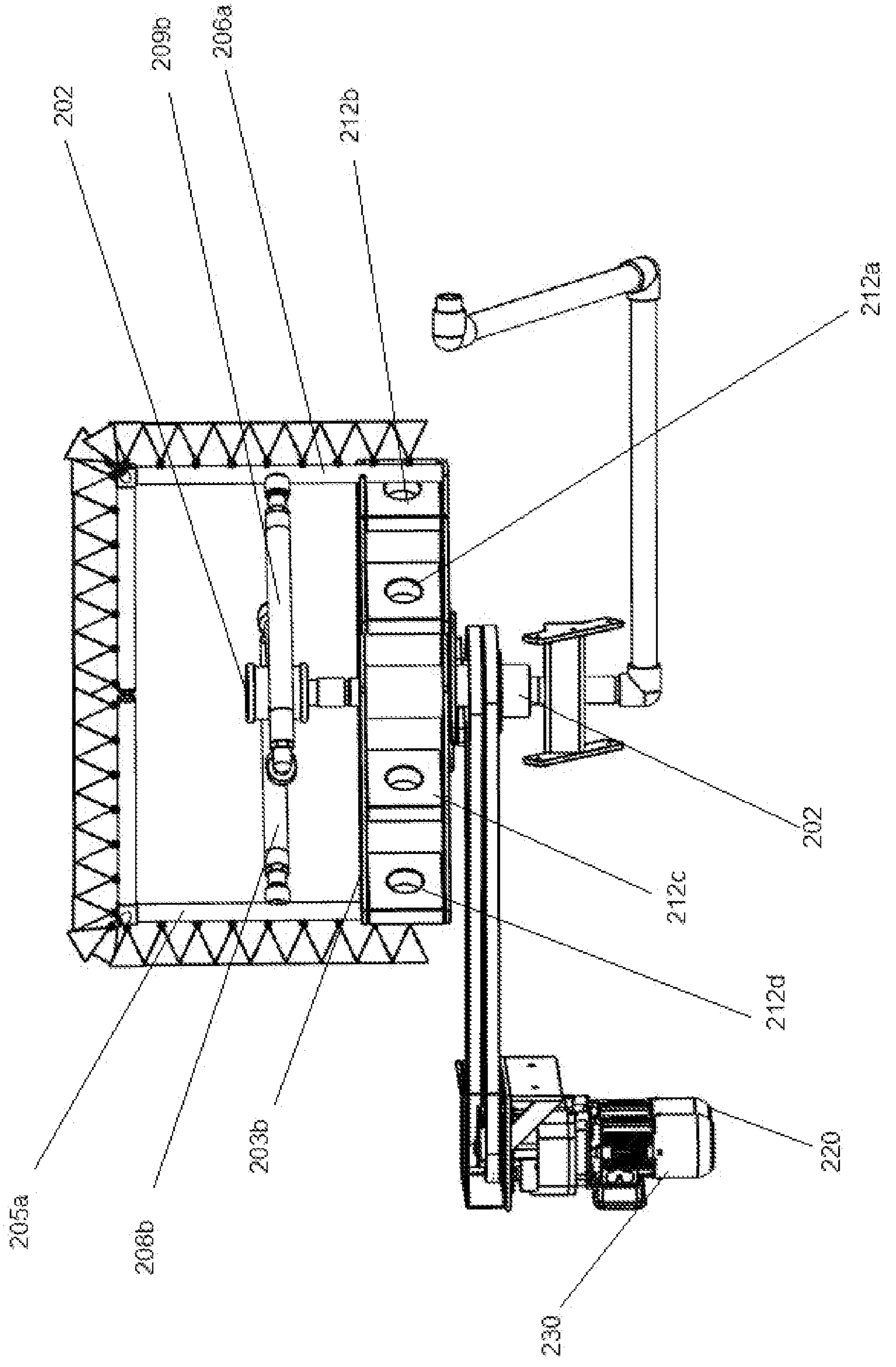
FIG. 5C is a side view of a rotating spraying apparatus according to an embodiment of the present invention.
Figure 5D:
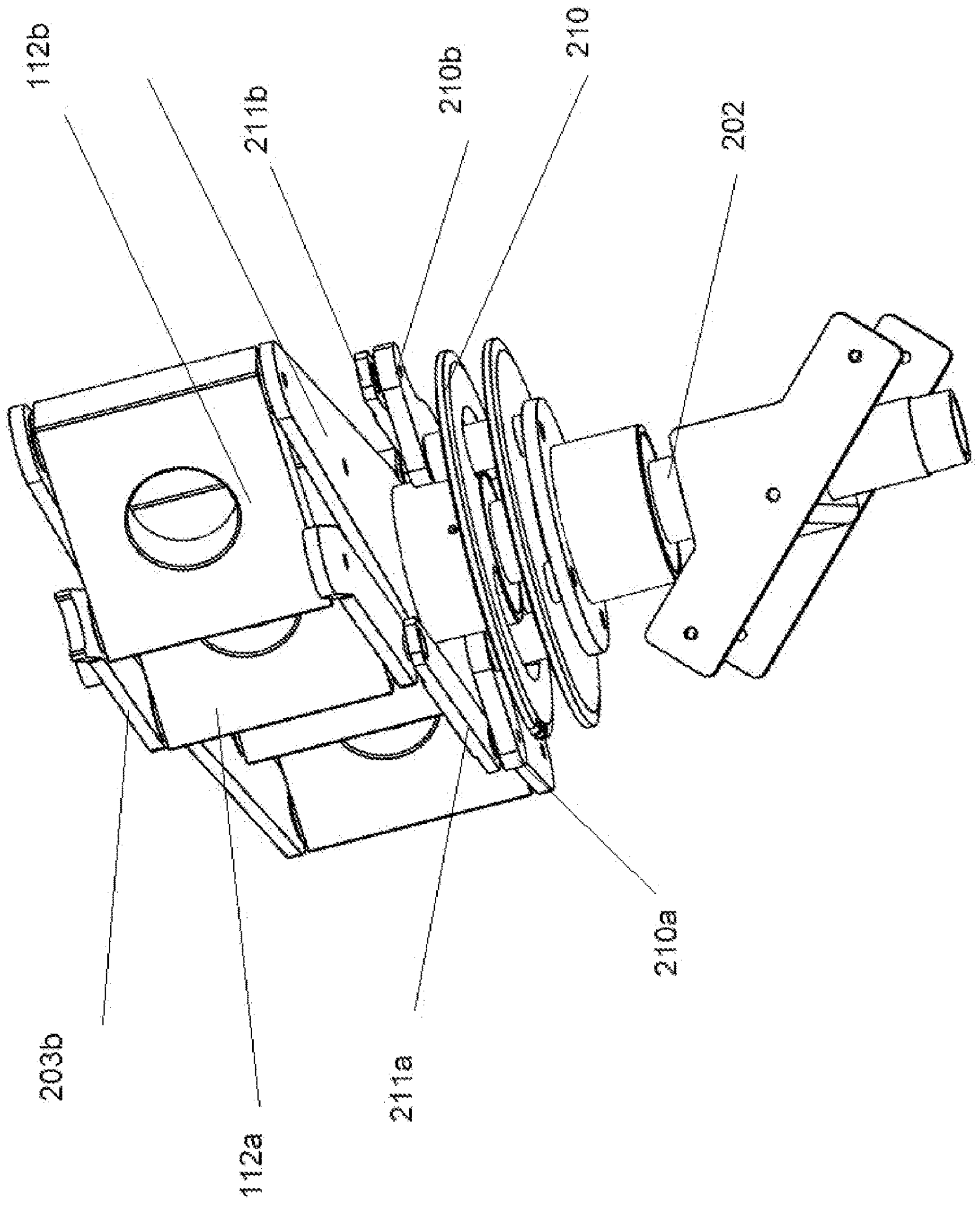
FIG. 5D is a close up view of a cam and linkage system of a rotating spraying apparatus according to an embodiment of the present invention.
Figure 6A:
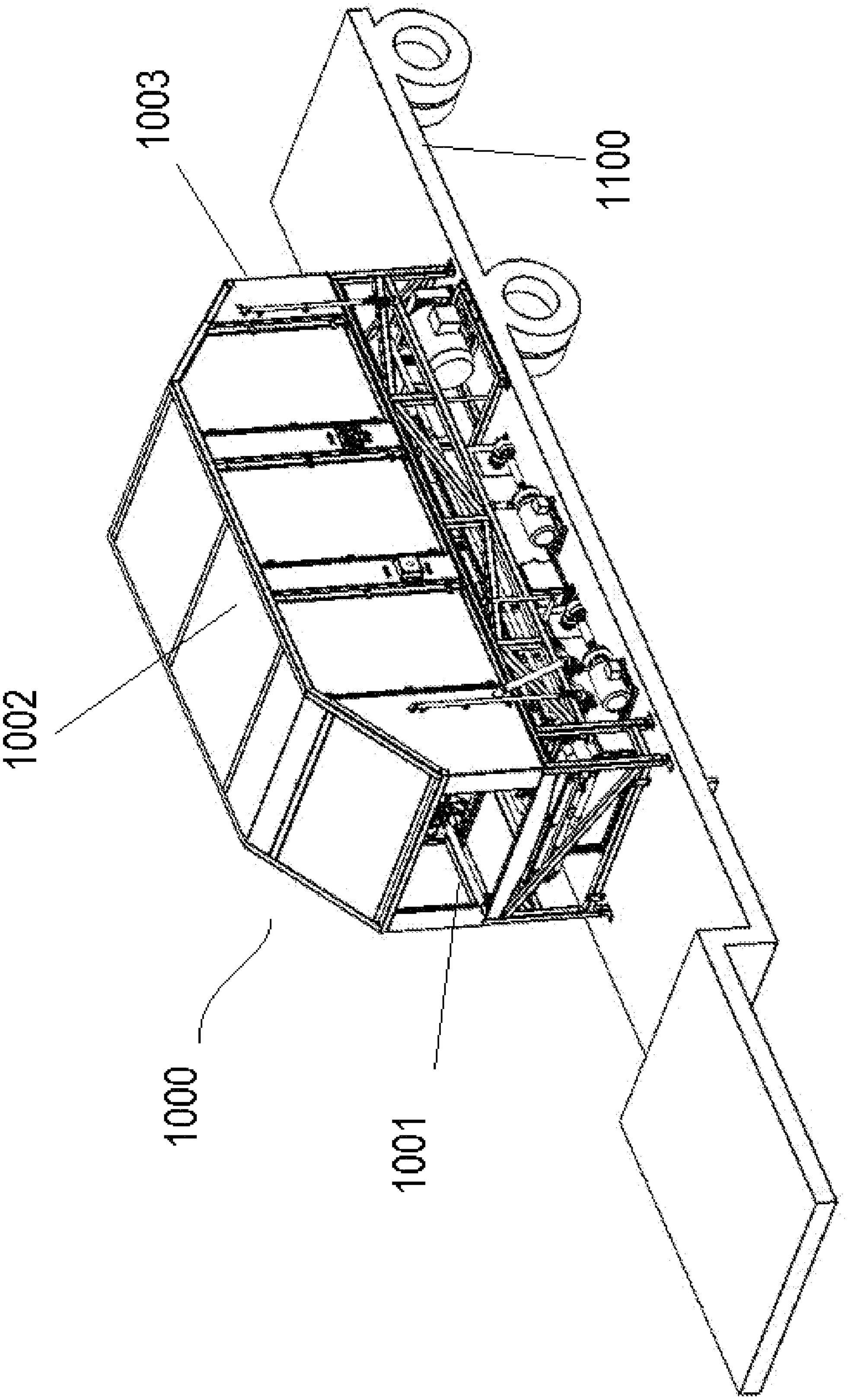
FIG. 6A is a perspective view of a bin washing system according to an embodiment of the present invention.
Figure 6B:
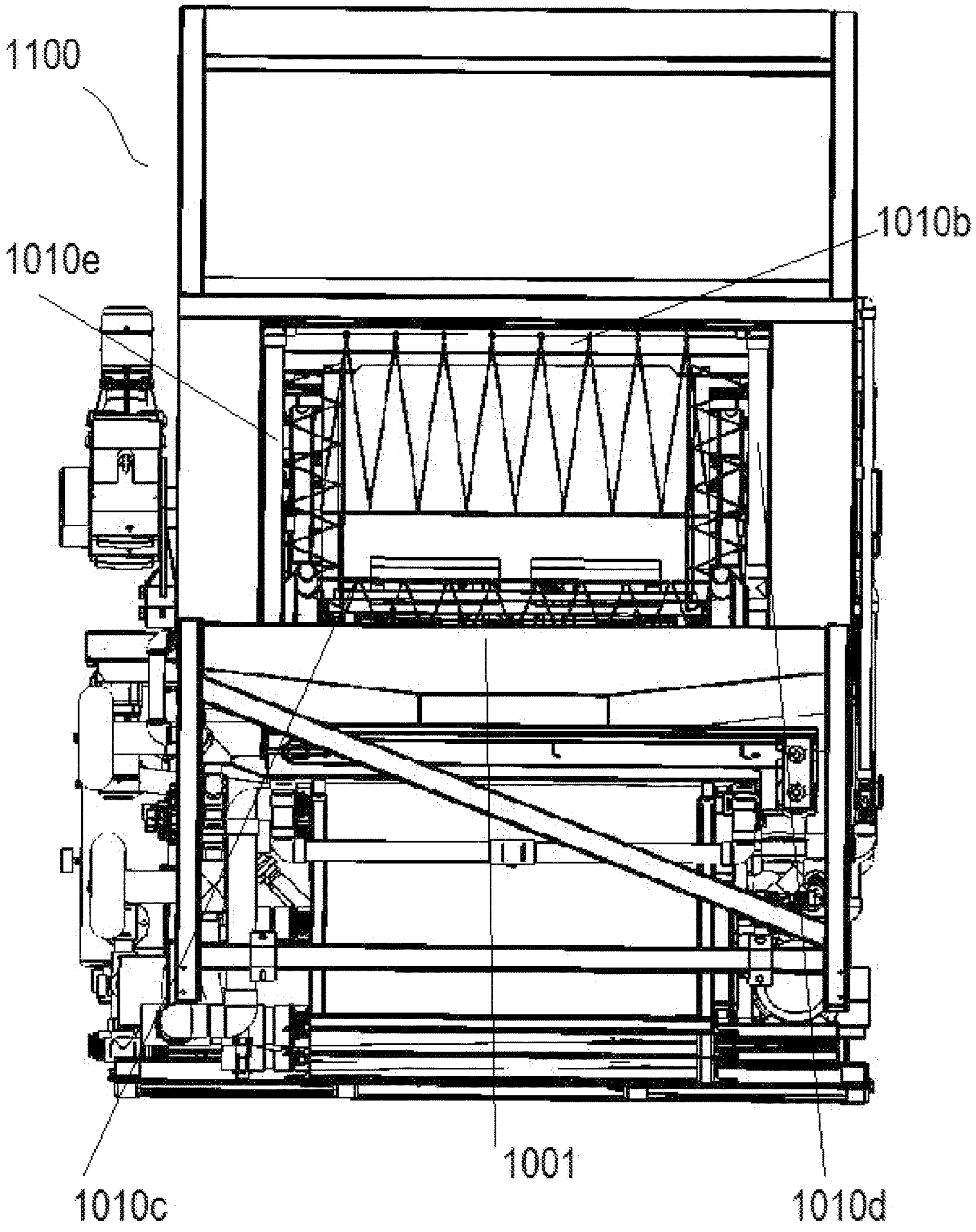
FIG. 6B is a side view of a bin washing system according to an embodiment of the present invention.
Figure 6C:
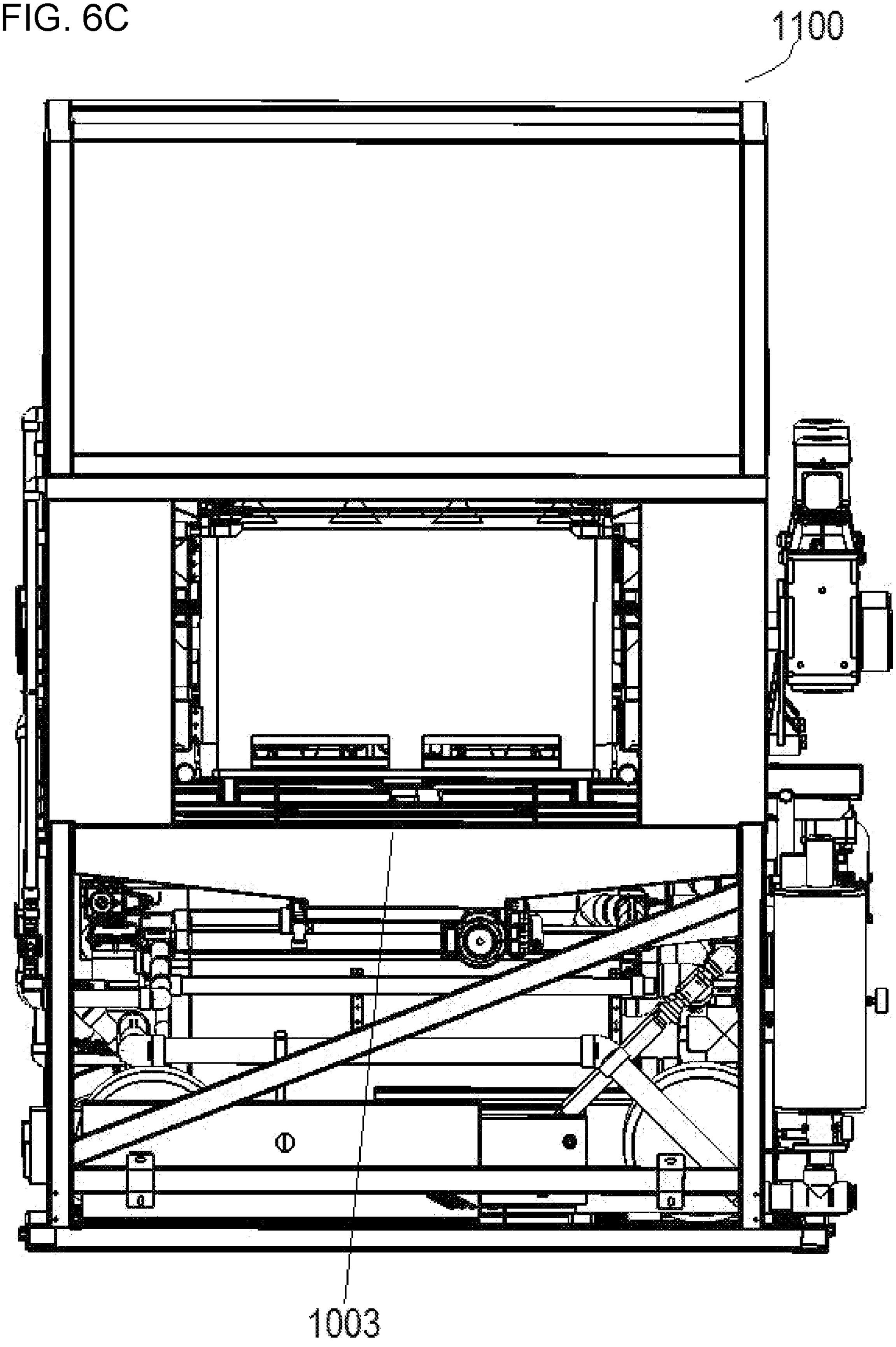
FIG. 6C is a side view of a bin washing system according to an embodiment of the present invention.
Figure 6D:
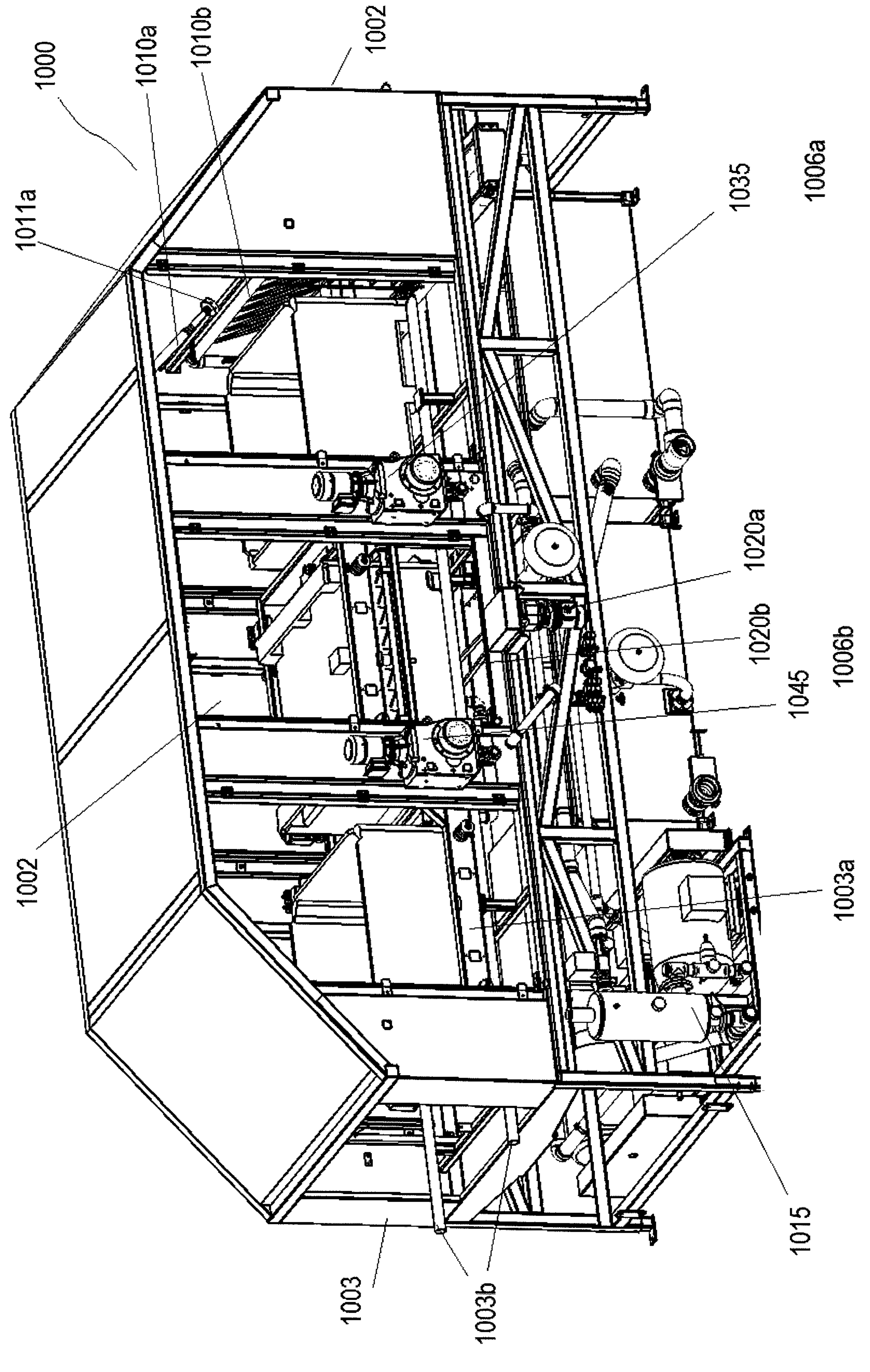
FIG. 6D is a perspective view of a bin washing system according to an embodiment of the present invention.

As shown in FIG. 5C, the exit station 1003 includes an opening sufficient to allow the bin to pass out of the bin washing system. In some embodiments, a conveying system may be positioned at the exit passage of the exit station 1003 to receive and transport the bins to a receiving and storage area. The exit station 1003 may include a sled or other transport mechanism to move the bins through the exit passage thereof. For example, the exit station 1003 may include a sled 1003*a* that is operable to slide along exit rails 1003*b*, which together allow the bin to be easily moved through the exit passage with little friction or resistance, and no lifting of the bin (see FIG. 6).

FIG. 6 provides a perspective view of the overall bin washing system 1000 with selected sidewalls removed to allow view of the interior of the bin washing system, including the loading bay 1001, the washing station 1002, and the exit station 1003. Several components of the bin washing system 1000 can be seen in this view, including the motor 1020*a* and belt 1020*b* for driving the rotation of the rotating axial shaft 102 of the rotating spraying apparatus 100 (spraying apparatus 200 may be alternatively incorporated into the bin washing system 1000). The motor 1020*a* may be an electric motor such as an AC motor, servo, or other electronic motor. The belt 1020*b* may engage with a driving axel of the motor 1020*a* at one end and with the sprocket or driving pulley 102*b* at the base of the axial shaft 102. A variable pressure pump system 1015 is shown, which is operable to supply fluid to the rotating spraying apparatus 100 and the additional spray bars and spray heads of the loading bay station 1001 and the washing station 1002 at high pressures in the range of about 200 PSI to about 4000 PSI. Also shown are the motors for the bin inversion mechanisms that transfer the bins from station to station within the system. Motor 1006*a* is operable to drive the rotation of the first bin inversion mechanism between the loading bay station 1001 and the washing station 1002, and motor 1006*b* is operable to drive the rotation of the second bin inversion mechanism between the washing station 1002 and the exit station 1003. The motors 1006*a* and 1006*b* for the inversion mechanisms may be electric motors such as an AC motor, servo, or other electronic motor.

Figure 7:
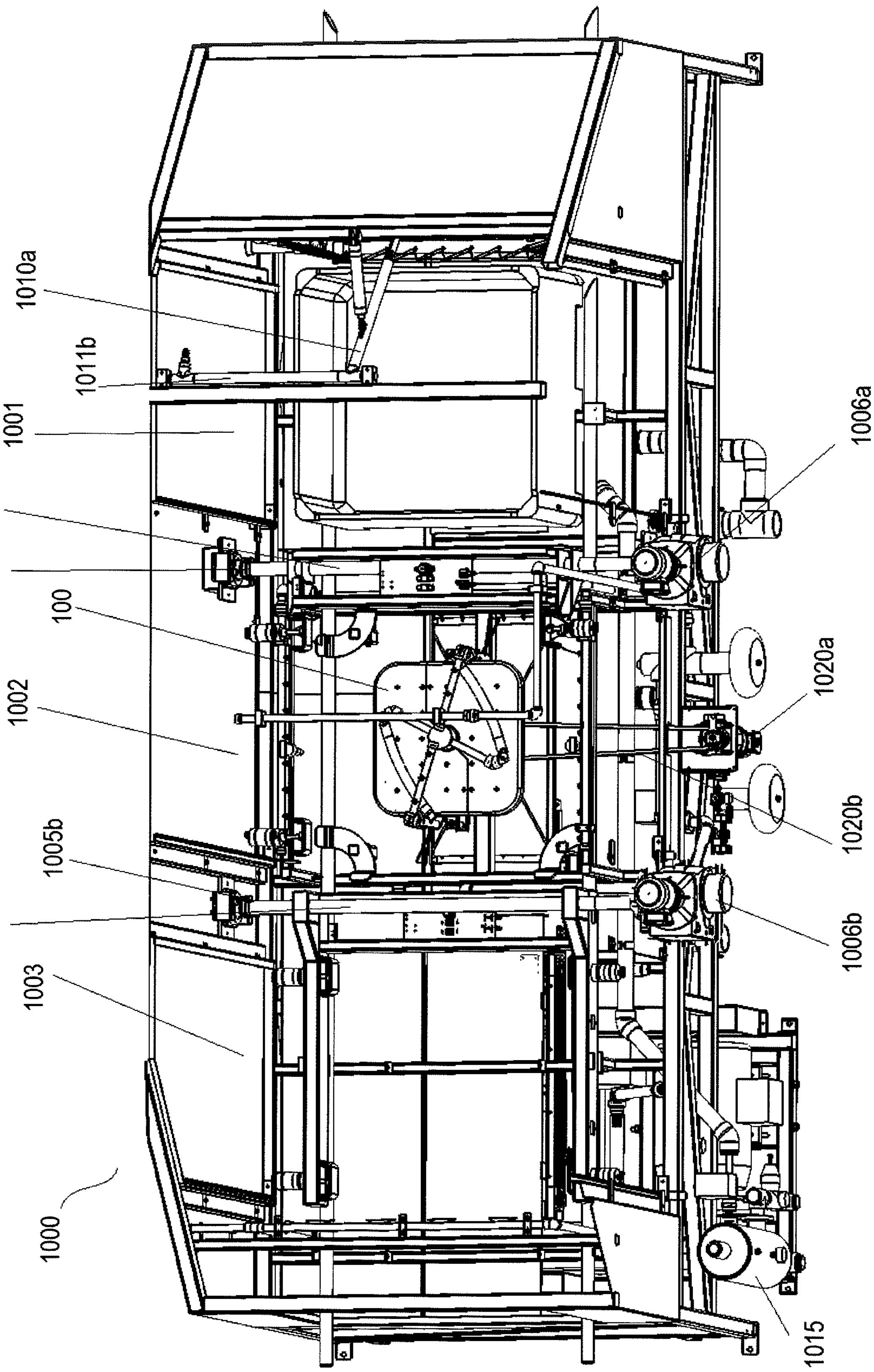
FIG. 7 is a top-side perspective view of a bin washing system according to an embodiment of the present invention.
Figure 10:
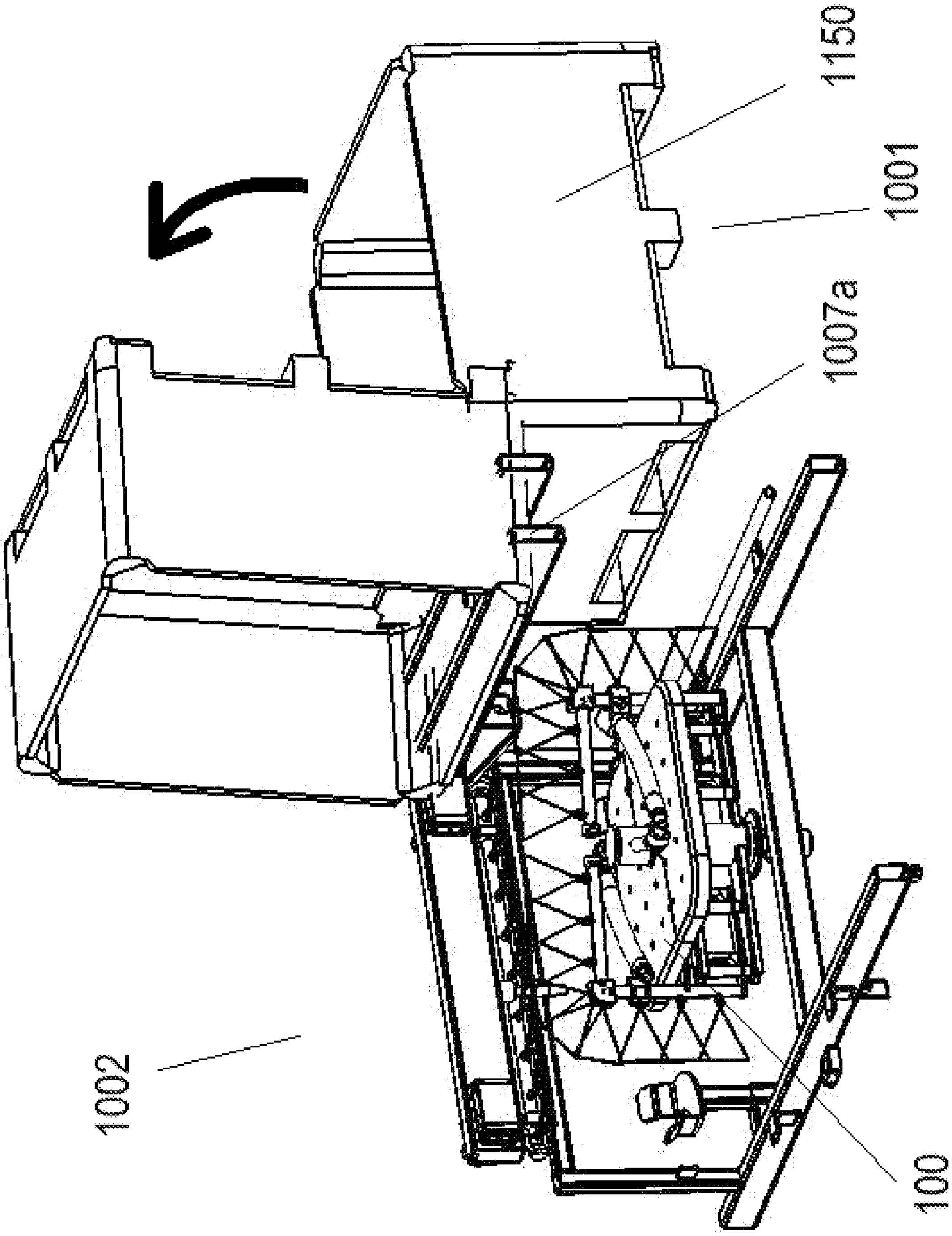
FIG. 10 is a perspective view of a bin washing system according to an embodiment of the present invention demonstrating a bin inversion mechanism.
Figure 11:
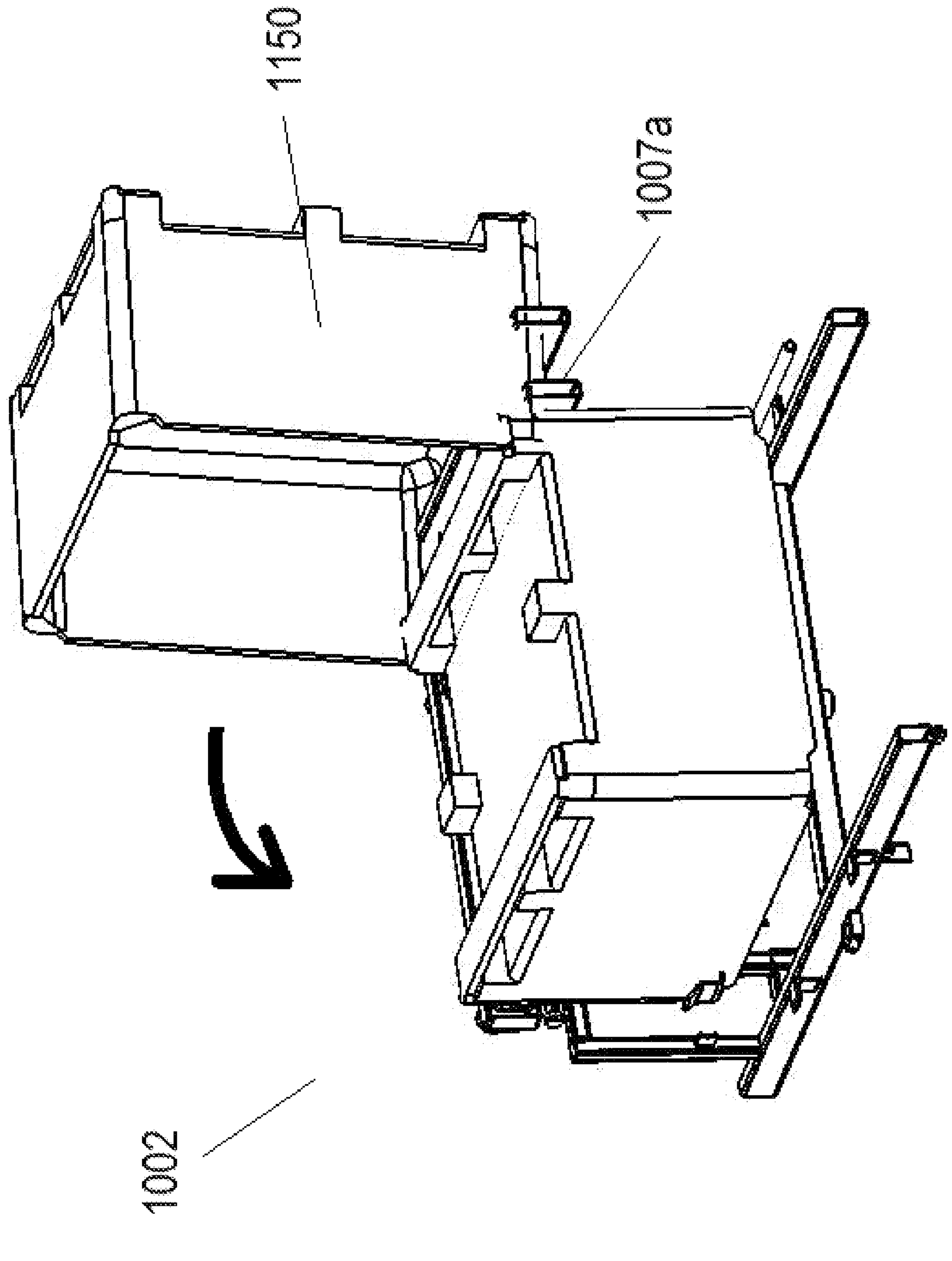
FIG. 11 is a perspective view of a bin washing system according to an embodiment of the present invention demonstrating a bin inversion mechanism.

FIG. 7 provides an overhead view of the bin washing system 1000 with selected sidewall panels and roof panels removed to allow views into the interior of the system. The loading bay station 1001, the wash station 1002, and the exit station 1003 are visible. The rotating spraying apparatus 100 can be seen within the washing station. Also, the first bin inversion mechanism 1005*a* and the second bin inversion mechanism 1005*b* can be seen. The first bin inversion mechanism 1005*a* is positioned between the loading bay station 1001 and the wash station 1002. The first bin inversion mechanism includes a clasping mechanism for clasping the sides of the bin, which includes clasping bars positioned on each lateral side of the loading bay station 1001. The clasping mechanism may include hydraulic actuators, pneumatic, solenoid actuator, or other linear actuators that are operable to move the clasping bars medially toward the lateral side walls of a bin positioned in the loading bay station and apply pressure to the sidewalls of the bin to thereby grasp the bin. The first bin inversion mechanism 1005*a* may also include an axel 1005*c* that may be rotated by motor 1006*a* once the clasping bars are engaged with and grasping the lateral sidewalls of the bin. FIGS. 10-11 provide a close up view of the transport and inversion of a bin by the first bin inversion mechanism 1005*a* between the loading bay station 1001 and wash station 1002. FIG. 10 shows the movement of the bin 1150 from the loading bay station to a transitional position between the loading bay station 1001 and the wash station 1002, as indicated by the arrow. FIG. 11 shows the movement of the bin 1150 from the transitional position to the wash station 1002, as indicated by the arrow. Once grasped by the clasping bars 1007*a*, the bin may be rotated as the axel 1005*d* is rotated to thereby transport the bin from the loading bay station 1001 to the washing station 1002, and invert the bin over the washing station 1002. Subsequently, the rotating spraying apparatus may be activated to spray out and clean the interior of the bin.

Figure 12:
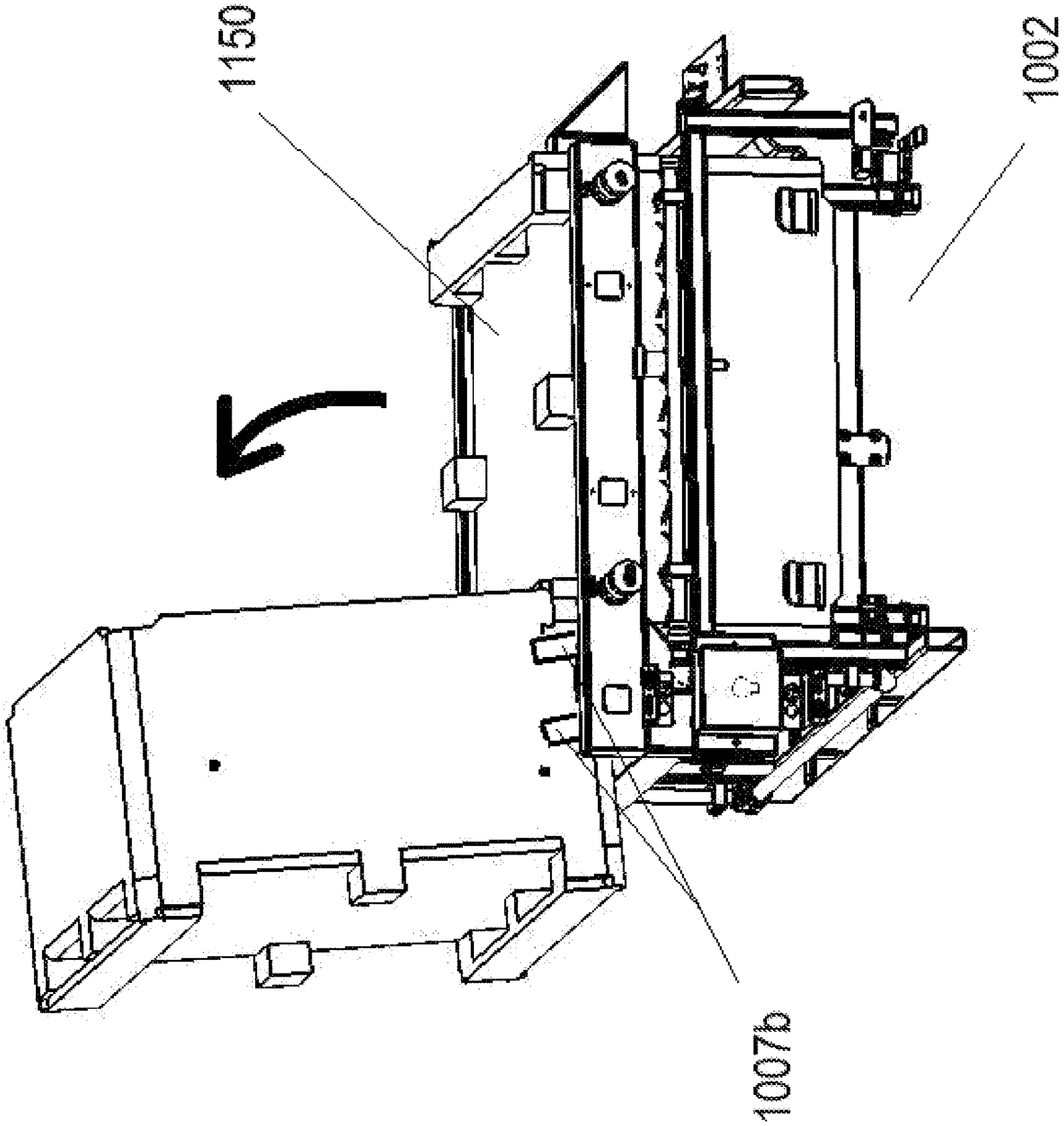
FIG. 12 is a perspective view of a bin washing system according to an embodiment of the present invention demonstrating a bin inversion mechanism.
Figure 13:
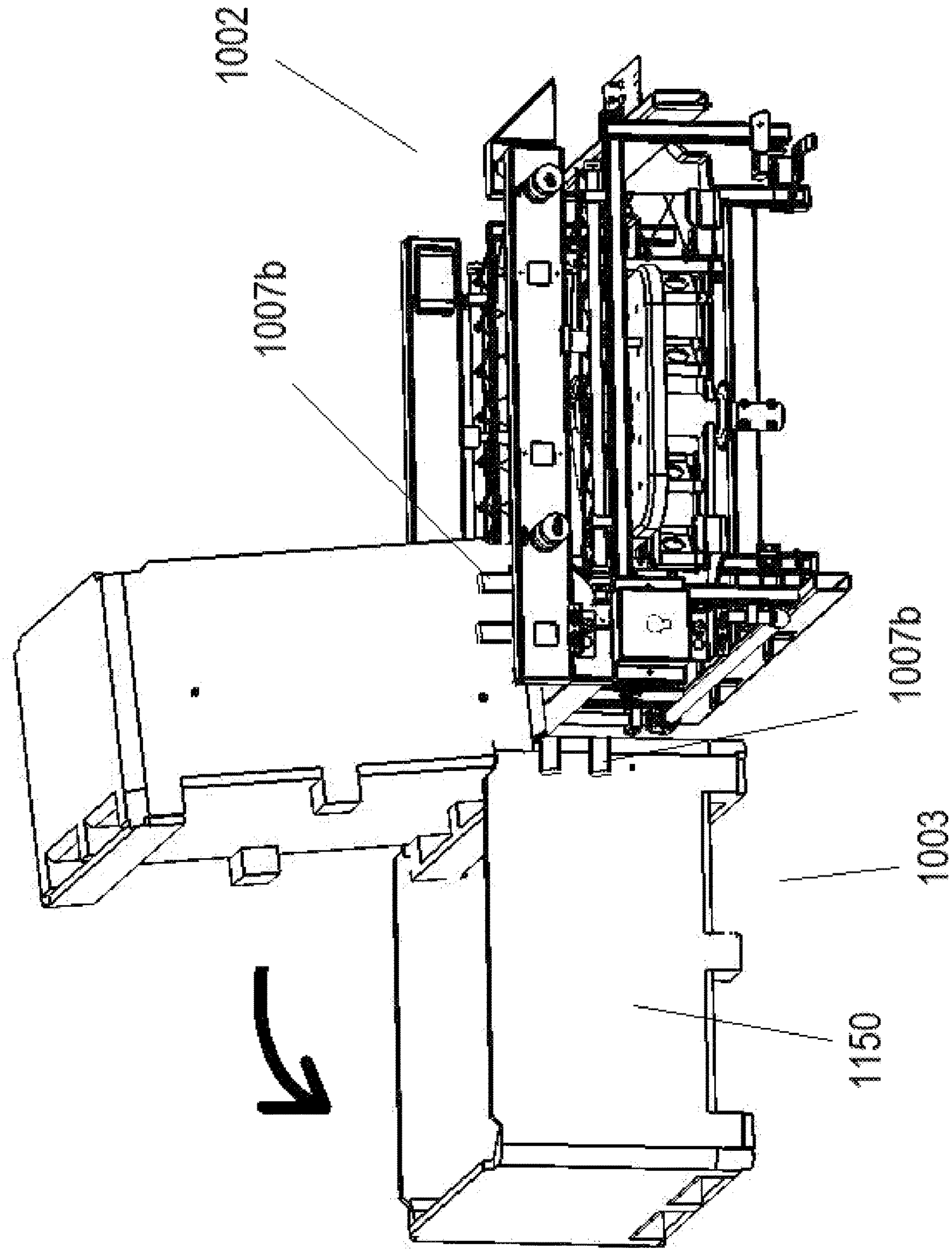
FIG. 13 is a perspective view of a bin washing system according to an embodiment of the present invention demonstrating a bin inversion mechanism.

The second bin inversion mechanism 1005*b* is positioned between the wash station 1002 and the exit station 1003. The second bin inversion mechanism includes similar components and has a similar function to that of the first bin inversion system 1005*a*. The second bin inversion system includes a clasping mechanism for clasping the sides of the bin with clasping bars 1007*b* positioned on each lateral side of the wash station 1002. The second bin inversion mechanism 1005*b* may also include an axel 1005*d* that may be rotated by motor 1006*b* once the clasping bars 1007*b* are engaged with and grasping the lateral sidewalls of the bin. FIGS. 12-13 provide a close up view of the transport and inversion of a bin by the second bin inversion mechanism 1005*b* between the wash station 1002 and exit station 1003. FIG. 12 shows the movement of the bin 1150 from the wash station to a transitional position between the wash station 1002 and the exit station 1003, as indicated by the arrow. FIG. 13 shows the movement of the bin 1150 from the transitional position to the exit station 1003, as indicated by the arrow. Once grasped by the clasping bars 1007*b*, the bin may be rotated as the axel 1005*d* is rotated to thereby transport the bin from the wash station 1002 to the exit station 1003, and invert the bin over the exit station 1003 such that the bin is right side up. Subsequently, the bin may be advanced through the exit hole of the exit station 1003.

Figure 8:
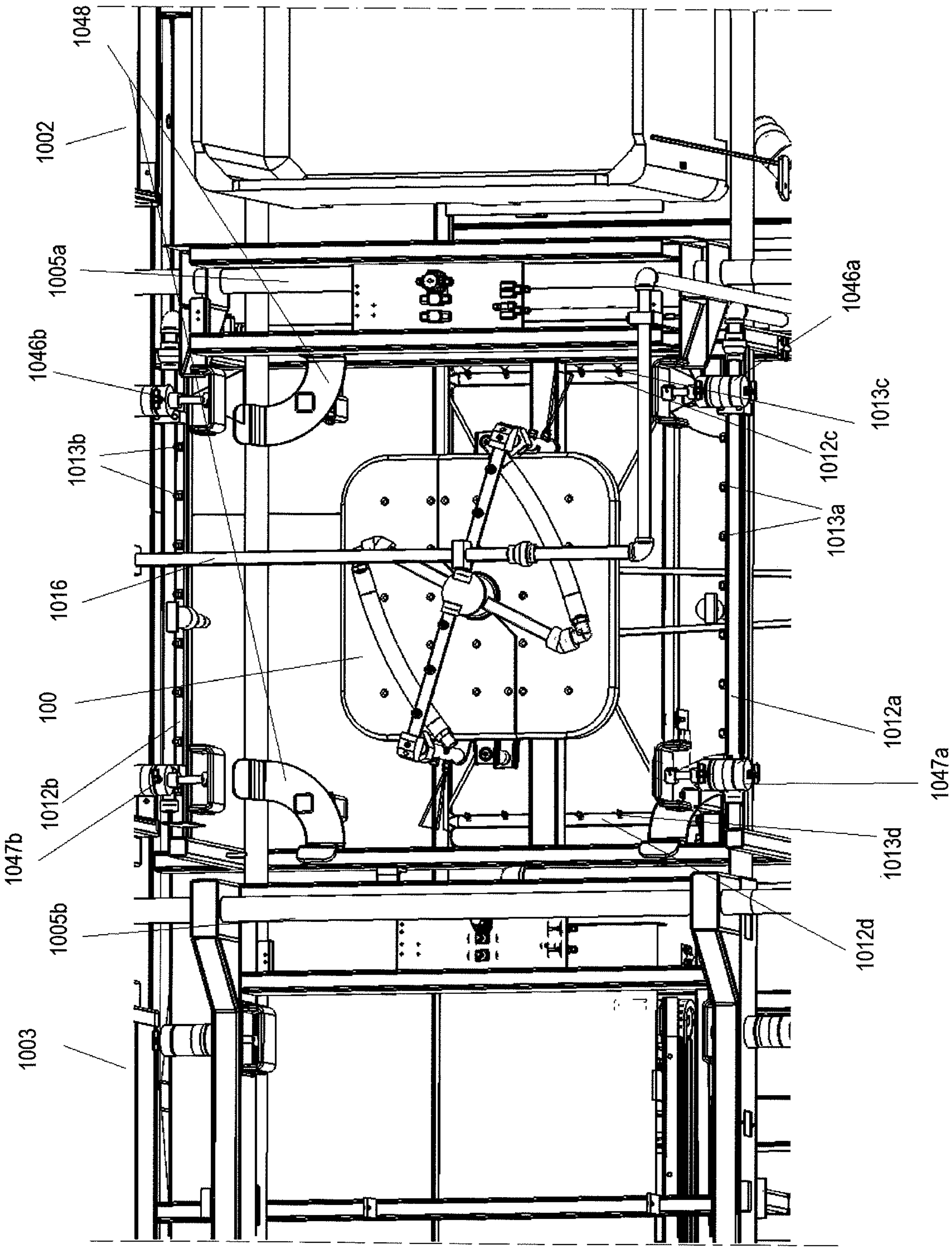
FIG. 8 is a close-up overhead view of a bin washing system according to an embodiment of the present invention.

FIG. 8 provides an up close overhead view of the wash station 1002, in which the rotating spraying apparatus 100 is positioned (the dashed lines in FIG. 8 indicate that portions of the bin washing system would not fit in the view and are not shown). Several other features of the wash station 1002 are visible. There are several additional spray bars that are visible for washing the outside surfaces of a bin positioned in the wash station 1002. The wash station includes an overhead spray bar 1016 for spraying the bottom of the bin, lateral spray bars 1012*a* and 1012*b* for spraying the lateral sides of the bin, and fore and aft spray bars 1012*c* and 1012*d* the leading and trailing sides of the bin. Each of these spraying bars includes high pressure nozzles for delivering a spray to the exterior of the bin: spray bar 1012*a* includes nozzles 1013*a*, spray bar 1012*b* includes nozzles 1013*b*, spray bar 1012*c* includes nozzles 1013*c*, spray bar 1012*d* includes nozzles 1013*d*, and overhead spray bar 1016 includes downward facing spray nozzles as well.

The wash station 1002 also includes bin handling features for positioning the bin properly in the wash station 1002. The bin handling features include bin pedestals 1048 in each corner of the wash station to suspend the bin at the proper height relative to the rotating spraying apparatus 100 such that the horizontal spray pipes of the rotating spraying apparatus 100 are at a predetermined distance from the bottom interior surface of the bin (e.g., in a range of about 2 to about 12 inches). The bin handling features also include sidewall clamps 1046*a*, 1046*b*, 1047*a*, and 1047*b* for engaging and applying pressure to the exterior sidewalls of the bin in order to hold the bin in proper position in the wash station 1002 as the rotating spraying apparatus 100 sprays the interior of the bin with high pressure jets of fluid. The sidewall clamps 1046*a*, 1046*b*, 1047*a*, and 1047*b* may include linear actuators that are activated to advance the clamps and apply pressure to the sidewalls of the bin before the rotating spraying apparatus is activated. The linear actuators may be hydraulic actuators, pneumatic actuators, a solenoid actuator, or some other form of linear actuator.

Figure 9:
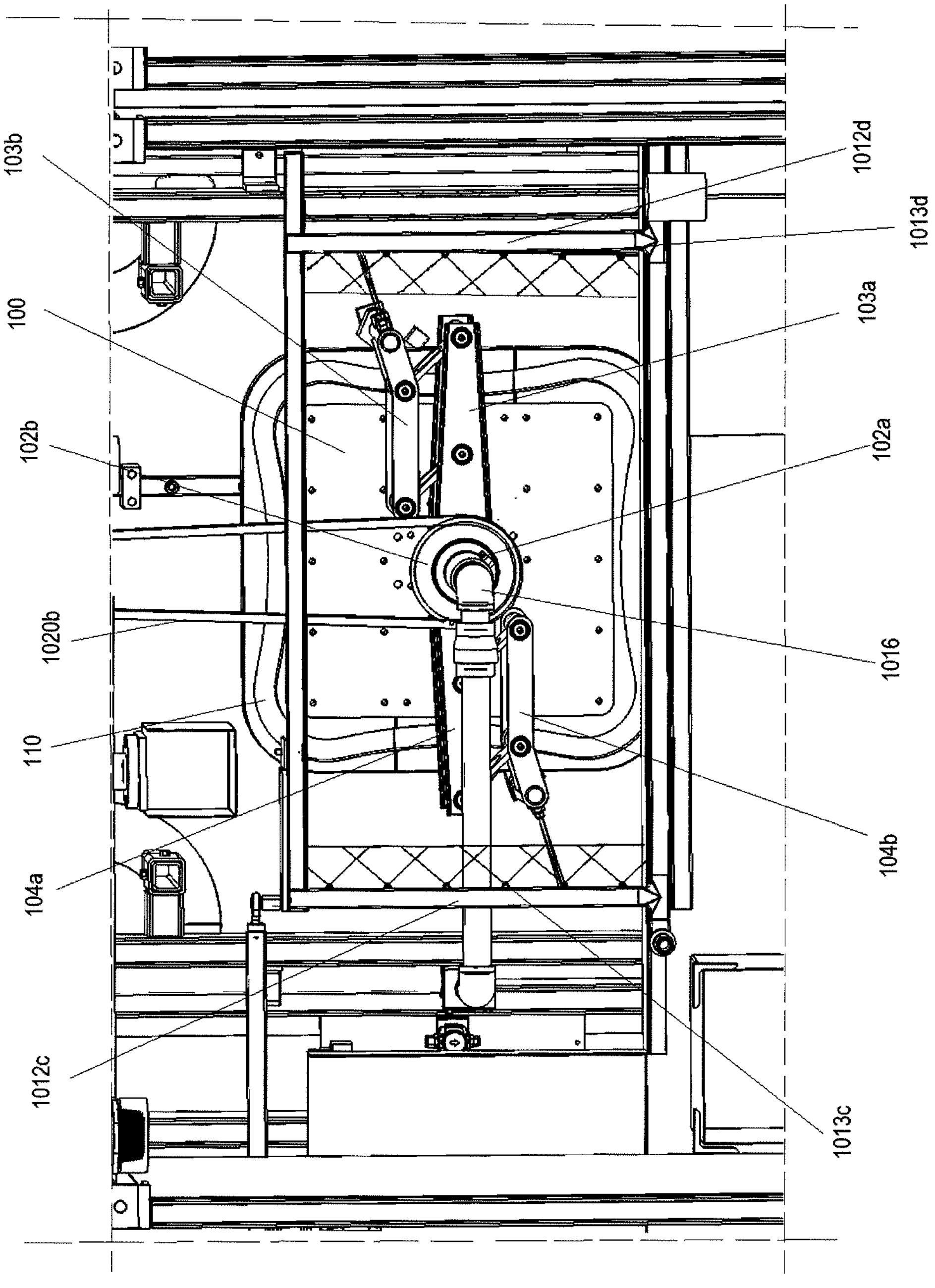
FIG. 9 is a close-up bottom view of a bin washing system according to an embodiment of the present invention.

FIG. 9 shows a bottom view of the wash station 1002, in which the rotating spraying apparatus is positioned (the dashed lines in FIG. 9 indicate that portions of the bin washing system would not fit in the view and are not shown). The bottom side of the rotating spraying apparatus 100 is shown, along with the connections between the axial shaft 102 and the belt 1020*b* and the fluid delivery pipe 1016. Specifically, the belt 1020*b* connects the motor 1020*a* for driving the rotation of the axial shaft 102 to the sprocket or drive pulley 102*b* at the base of the axial shaft 102. Also, the fluid delivery pipe 1016 is in fluid communication with the variable pressure pump system 1015 and delivers fluid from the pump 1015 under pressure to the interior passage 102*a* of the axial shaft 102, such that the pressurized fluid is delivered through the interior passage 102*a* to the spraying manifolds of the rotating spraying apparatus 100.

FIG. 9B shows an alternative arm mechanism for the wash station. As shown in FIG. 9B, the extendable arm may include an electronic camming system that extends the arm into the corners of the bin. The control mechanism may be an electronic control system that includes electromechanical programming stored on the controller for operating the electronic camming system. The controller may include a pre-programmed algorithm for adjusting the distance between the one or more extendable-retractable portions of the extendable arms and the interior wall of the bin. The extendable-retractable portions may be connected to a rotating portion of the arm by parallel-motion linkage bars to pivot and extend with the extendable portion of the extendable articulating arm. The position of the extendable-retractable portions along the rotating arm may be controlled by a chain mechanism. The extendable-retractable portion may include at least one sprocket or other device that engages with the chain such that the movement of the chain moves the extendable arm proximally and distally with respect to the static arms. As the extendable portions move proximally and distally, the spraying manifold moves proximally and distally with the extendable-retractable portion as the spraying apparatus spins within the agricultural bin. The chain may be driven by an electric motor (e.g., a stepper motor, a Servo, etc.) that is controlled by the controller that is pre-programmed to activate the motor to move the chain in both rotational directions to extend and retract the extendable-retractable portion as the rotating arm moves around the interior of an agricultural bin. The movement of the chain in one direction may cause the spraying mechanism to move distally to accommodate a greater radial distance of the interior wall of the bin, and movement of the chain in the opposite direction may cause the spraying mechanism to move proximally along the rotating arm to accommodate a lesser radial distance of the interior wall of the bin. The bin washing system 1000 may wash a plurality of bins in succession, each being loaded into the system through the loading bay station 1001 and being passed successively through the loading bay station 1001, the wash station 1002, and the exit station 1003 sequentially. The bin washing system of the present invention may include a conveying system that delivers bins to the loading bay station in succession, such that a plurality of bins may be placed on the conveying system, and the conveying system may them deliver the bins to the loading bay station one at a time. In some embodiments, the conveying system may be a horizontal belt. In other embodiments, the conveying system may be a vertical or obliquely angled chute into which a vertical stack of bins may be deposited by a forklift, crane, or other bin-handling machinery.

The bin washing system 1000 may further include a conveying system for receiving bins from the exit station 1003. A belt system may be integrated into the bin washing system 1000 that may receive washed bins in succession from the sled 1003*a*. In other embodiments, a vertical or obliquely angled bin collection elevator may receive the bins from the exit station 1003 and place several washed bins in a stack that can be retrieved from the collection elevator by a forklift or other machinery, such that the bins are washed and stacked for storage in an automated fashion. The elevator may use a belt having incrementally spaced platforms or tines that sit under and lift each bin. The platforms or tines may positioned on the belt similarly to buckets in a grain elevators belt, but have a flat construction that sits under the bin without creating gaps between the bins.

The bin washing system of the present invention may also include a self-cleaning function to be executed after it has been used to clean one or more bins. After all bins have been cleared from the interior of the bin washing system, the spray bars and heads and the rotating spraying apparatus may be simultaneously or in succession for a predetermined period of time (e.g., in a range of about 30 seconds to about 5 minutes, or any value therein) to dislodge and remove any debris from the one or more bins that has settled or attached to the interior of the bin washing system.

The bin washing system may be operable to clean a plurality of bins in succession, thereby providing an automated and efficient bin washing system that reduces overall costs of the bin washing process and effectively removes debris and contamination from the bins, while using water conservatively and efficiently.

The bin washing system 1000 and other embodiments described herein are exemplary, and does not limit the scope of the invention. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

The invention claimed is:

1. A stationary apparatus for washing the interior of a polygonal agricultural bin placed over the apparatus, comprising:

a. at least one articulating arm mechanically engaged with a parallel motion linkage operable to extend and retract said at least one articulating arm;

b. a central rotating member having at least one fixed arm attached to the central rotating member, wherein the parallel motion linkage is pivotally connected to the at least one fixed arm, the central rotating member being operable to rotate the at least one fixed arm with respect to a central axis, wherein said at least one articulating arm extends and retracts in a radial orientation to said central axis and comprises a longitudinal axis that is maintained in a parallel orientation to a longitudinal axis of said at least one fixed arm as said at least one fixed arm rotates, and wherein the longitudinal axis of the articulating arm is offset from the longitudinal axis of the fixed arm; and c. a spraying member attached to said at least one articulating arm, the spraying member positioned to spray in a direction that is parallel to the rotational plane of the at least one fixed arm, wherein said spraying member is maintained at a constant distance from sidewalls of said polygonal bin as the at least one fixed arm rotates around the central rotating member.

2. The apparatus of claim 1, wherein the spraying member includes a first pipe that is parallel to the floor of the polygonal bin when said apparatus is positioned within the agricultural bin and a second pipe that is parallel to the sidewalls of the polygonal bin when said apparatus is positioned within the polygonal bin.

3. The apparatus of claim 2, further comprising a first plurality of spraying heads positioned on said first pipe, and a second plurality of spraying heads on said second pipe.

4. The apparatus of claim 1, wherein said apparatus includes a second articulating arm and a second fixed arm attached to said central rotating member, and a second parallel mechanical linkage connecting said second fixed arm and said second articulating arm for extending and retracting the second articulating arm in a pre-determined pattern.

5. The apparatus of claim 4, wherein said apparatus is operable to maintain a second plurality of spraying heads on said second articulating arm at a constant distance from said sidewalls of said polygonal bin as said at least one fixed arm is rotated through the interior of the agricultural bin by extending and retracting said second articulating arm.

6. The apparatus of claim 1, further comprising a mechanism for extending and retracting said spraying member that includes a rotor that is rotated independently of said central rotating member and is connected to a belt drive system that is activated according to programming executed by a controller in electronic communication with an electronic motor of said belt drive, wherein said programming moves said parallel mechanical linkage in a pattern that is complementary to the interior perimeter of the polygonal bin, such that the spraying member is maintained at a consistent distance from the interior of the sidewall of the polygonal bin as the rotating member rotates said articulating arm.

7. The apparatus of claim 6, wherein said rotor includes a cam and a bar linkage connects said cam to a predetermined position on said parallel mechanical linkage of said at least one articulating arm, and rotation of the rotor in a first direction moves said parallel mechanical linkage radially outward and rotation of the rotor in a second direction moves said parallel mechanical linkage radially inward.

8. The apparatus of claim 1, wherein the at least one fixed arm is connected to said at least one articulating arm by said parallel mechanical linkage.

9. An agricultural bin washing system comprising:

a. a wash station having a rotating spraying apparatus for cleaning an interior of said agricultural bin including i. a rotating arm having a fixed portion having a longitudinal axis and an extendable portion having a second longitudinal axis, said extendable portion connected to said fixed portion by a parallel motion linkage allowing for extension and retraction of the extendable portion in which said second longitudinal axis of said extendable portion and said longitudinal axis of said fixed portion remain substantially parallel to each other, and wherein the second longitudinal axis of said extendable portion is offset from said longitudinal axis of said fixed portion, ii. a central rotating member attached to the fixed portion of the rotating arm, said rotating member being operable to rotate the rotating arm thereby moving said extendable portion around the interior of a bin removably placed over the washing station, and iii. an extendable spraying member attached to said extendable portion, wherein as the central rotating member rotates and rotates the rotating arm around the interior of said bin, the radial distance of the extendable spraying member from the central rotating member changes and said extendable spraying member is maintained at a constant distance from sidewall surfaces in said bin.

10. The system of claim 9, wherein a mechanism for extending and retracting said extendable portion and thereby said extendable spraying member includes a rotor that is rotated independently of said central rotating member and is connected to a belt drive system that is activated according to programming executed by a controller in electronic communication with an electronic motor of said belt drive, wherein said programming moves said extendable spraying member in a pattern that is complementary to the interior perimeter of the bin, such that the extendable portion is maintained at said constant distance from the sidewall surfaces of the bin as the central rotating member rotates said rotating arm, wherein the sidewall surfaces vary in distance from the center of the bin.

11. The system of claim 10, wherein said rotor includes a cam and a bar linkage connects said cam to a pre-determined position on said extendable portion, and rotation of the rotor in a first direction moves said extendable portion radially outward and rotation of the rotor in a second direction moves said extendable portion radially inward.

12. The system of claim 9, further comprising a bin delivery mechanism operable and an inverting mechanism for turning and placing agricultural bins over said wash station over a guide structure such that the bin is aligned with a complementary pattern of a pre-determined track.

13. The system of claim 9, further comprising a second spraying mechanism for spraying the exterior of the bin when said bin is positioned over a guide structure.

14. The system of claim 13, wherein said second spraying mechanism includes spraying heads for spraying the exterior of the bottom of the bin and at least one lateral side of the bin.

15. The system of claim 9, wherein the central rotating member has an axle and at least one driving arm that is fixedly attached to said axle.

16. The system of claim 9, wherein said extendable portion of said rotating arm is operable to move in parallel along the length of the fixed portion and is connected to said fixed portion by said parallel motion linkage.

17. A stationary apparatus for washing the interior of a polygonal agricultural bin, comprising:

a. at least one articulating arm mechanically engaged with a fixed arm by a parallel motion linkage operable to extend and retract said at least one articulating arm with to varying radial distances into corners of said polygonal bin, wherein said at least one articulating arm comprises a longitudinal axis that remains parallel to a second longitudinal axis of said fixed arm as said at least one articulating arm extends and retracts, and wherein the longitudinal axis of the articulating arm is offset from the second longitudinal axis of the fixed arm;

b. a central rotating member connected to said fixed arm that rotates with respect to a central axis; and c. a spraying member attached to said at least one articulating arm and having a spray emitter directed radially outward from said at least one articulating arm, wherein said spraying member is maintained at a constant distance from sidewalls of said polygonal bin as the central rotating member rotates, wherein the polygonal bin is removably placed over the stationary apparatus.

18. The apparatus of claim 17, wherein the spraying member includes a first pipe that is parallel to the floor of the polygonal bin when said apparatus is positioned within the agricultural bin and a second pipe that is parallel to the sidewalls of the polygonal bin when said apparatus is positioned within the polygonal bin.

19. The apparatus of claim 18, further comprising a first plurality of spraying heads positioned on said first pipe, and a second plurality of spraying heads on said second pipe.

20. The apparatus of claim 19, wherein said apparatus is operable to maintain said second plurality of spraying heads at a constant distance from said sidewalls of said polygonal bin as said at least one articulating arm is rotated through the interior of the agricultural bin by extending and retracting said spraying member.

* * * * *